United States Patent
Kubota et al.

(10) Patent No.: US 7,136,339 B2
(45) Date of Patent: Nov. 14, 2006

(54) POSITIONING CONTROL APPARATUS AND METHOD CAPABLE OF REDUCING RELATIVE POSITION ERROR WITHOUT INCREASING GAIN AND FREQUENCY BAND OF TRANSFER CHARACTERISTICS OF CONTROL SYSTEM

(75) Inventors: Masashi Kubota, Tokyo (JP); Shigeru Shimonou, Tokyo (JP); Naotoshi Iwazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 10/156,132

(22) Filed: May 29, 2002

(65) Prior Publication Data

US 2003/0053243 A1 Mar. 20, 2003

(30) Foreign Application Priority Data

| May 30, 2001 | (JP) | ............................. 2001-162739 |
| Jun. 4, 2001 | (JP) | ............................. 2001-167790 |
| Jul. 4, 2001 | (JP) | ............................. 2001-203451 |

(51) Int. Cl.
*G11B 7/00* (2006.01)

(52) U.S. Cl. ................... 369/53.29; 369/44.11; 369/44.28; 369/53.39

(58) Field of Classification Search ............. 369/53.79
See application file for complete search history.

(56) References Cited

FOREIGN PATENT DOCUMENTS

| JP | 56065211 A | * | 6/1981 |
| JP | S56-65211 A | | 6/1981 |
| JP | 60-57085 B2 | | 12/1985 |
| JP | H01-138663 A | | 5/1989 |
| JP | H03-108010 A | | 5/1991 |
| JP | 2001-126421 A | | 5/2001 |
| JP | 2001126421 A | * | 5/2001 |

OTHER PUBLICATIONS

English translation of JP 2001-126421; English translation( Abstract) of JP 56-065211.*

* cited by examiner

*Primary Examiner*—Wayne Young
*Assistant Examiner*—Jorge L. Ortiz-Criado
(74) *Attorney, Agent, or Firm*—Sughrue Mion, PLLC

(57) ABSTRACT

A positioning control apparatus for controlling a moving member to trace the position of a target member which almost equally repeats the position shift at a predetermined period comprises a position detector for detecting a relative position error, a first adder for adding a delay signal and a position error signal, a signal delay unit for outputting the delay signal which is obtained by delaying an output signal of the first adder at a period corresponding to the position shift of the target member, a second adder for adding the position error signal and the delay signal, a third adder for adding an output of the second adder and the delay signal via a filter, a compensating unit for performing the compensation for offset and/or the compensation for stabilization of the positioning control apparatus based on an output of the third adder, a drive unit for driving the moving member based on an output of the compensating unit, and a delay-amount setting unit for setting the amount of delay of a signal delayed by the signal delay unit.

86 Claims, 15 Drawing Sheets

POSITIONING CONTROL APPARATUS AND METHOD CAPABLE OF REDUCING RELATIVE POSITION ERROR WITHOUT INCREASING GAIN AND FREQUENCY BAND OF TRANSFER CHARACTERISTICS OF CONTROL SYSTEM

BACKGROUND OF THE INVENTION

The present invention relates to a technology for controlling the operation for positioning and tracing a member to a target position. More particularly, the present invention relates to a radial tracking control apparatus or an axial tracking control (focus control) apparatus in an optical disk apparatus or a positioning control apparatus for positioning and tracing a transducer for recording and reading a signal of a laser beam spot, a magnetic head onto a disc-shaped recording medium, such as a tracking apparatus in a magnetic disk apparatus, and a positioning control method.

Conventionally, optical disk apparatuses for recording or reading information by irradiating laser beams onto a disk-shaped recording medium are widely used. As the above-mentioned optical disk apparatuses, there are a CD, a CD-R, a CD-RW, a DVD-ROM, etc. These optical disk apparatuses require the beam tracking to a track for recording information with high accuracy so as to improve the density for recording the information. Further, these optical disk apparatuses require the focus control (axial tracking) with high accuracy in accordance with the vertical deviation of an optical-disk surface.

In general, the improvement in accuracy of the tracking control uses a method for improving a loop gain of a control system and increasing a response frequency of the control-system loop. However, since characteristics of a mechanical system for moving a moving member are limited, the above-mentioned method cannot ensure sufficient accuracy.

In order to solve the above problem, a position error is compressed by using the regularity of the vertical deviation of the optical-disk or the eccentric of a recording track of the disk-shaped recording medium. That is, the rotation of the optical disk causes the position shift on the optical-disk or the radial movement of the optical-disk, and a position shift component or a radial-movement component is approximately synchronized with the rotation of the optical disk. Therefore, the tracking of the moving member (laser beam spot) to a target member (information recording position on the optical disk) can be improved by a position offset signal from one to several numbers of rotations by using the periodicity of the position shift of the information recording position on the optical disk.

As disclosed in Japanese Examined Patent Application Publication No. 60-57085, a "positioning control apparatus" is proposed (hereinafter, referred to as a first conventional art). According to the first conventional art, the positioning control apparatus comprises a signal delay unit for adding and accumulating a position error signal synchronously with a rotational period every position shift with a predetermined period. Consequently, the position error signal is added and is inputted to the signal delay unit, and a moving member is driven based on a signal obtained by adding the position error signal.

Herein, it is defined that a basic control unit comprises a position detector for detecting a relative position error between a target member and the moving member, a compensating unit for performing at least one of compensation for stabilization of a control loop and compensation for offset, and a drive unit for driving the moving member, which are serially combined.

According to the first conventional art, a transfer function of the basic control unit is expressed by G(s) and a periodic position shift of the target member is expressed by Xi. In this case, if the periodic position shift Xi is repeated n times, a relative position error Xe is expressed by $[Xe=Xi/\{1+G(s)\}n]$ which means that an output of delay means comes close to $Xi/G(s)$.

More specifically, the relative position error makes an approach to zero within a frequency band having an absolute of [1+G(s)], which is larger than 1. Therefore, a signal for tracking a positioning member to the periodic position shift is applied almost by the output of the signal delay unit. Thus, the tracking can excessively be improved without so increasing the gain of the basic control unit (absolute of G(s)) or the response frequency.

A "positioning control apparatus and a positioning control method" are obtained by further improving the first conventional art as disclosed in Japanese Patent Application No. 2001-030525 (hereinafter, referred to as a second conventional art).

According to the second conventional art, the positioning control apparatus comprises a signal delay unit which adds and accumulates a relative error between a target position which is periodically shifted and a moving member. An output of the signal delay unit is added to a position error signal at this time. The moving member is driven based on the addition signal and a signal obtained by filtering processing of the output of the signal delay unit of a filter having specified characteristics.

According to the second conventional art, it is assumed that a transfer function of a filter is expressed by F(s). When the periodic position shift is repeated n times, a relative position error Xe is expressed by $[Xe(n)=\{(1-G(s)F(s))n-1/(1+G(s))n\}-Xi]$.

By setting proper filter characteristics F(s) in such a manner that a value of G(s)F(s) approaches 1, even if a value of [1+G(s)] is smaller than 1 and [1−G(s)F(s)] as a numerator is further smaller, the remaining position error Xe(n) can come close to zero.

However, the first and second conventional arts can be applied to an optical disk apparatus using a CAV (Constant Angular Velocity) format as a recording format because the rotational period of the optical disk apparatus is approximately constant, irrespective of the position of the laser beam spot in the radius direction of the optical disk apparatus. On the other hand, although the first and second conventional arts can be applied to an optical disk apparatus using a CLV (Constant Linear Velocity) format as the recording format, there is a drawback that the increase in accumulated phase offsets of the position error signal, relative to a rotational phase of the optical disk apparatus, causes the deterioration in compression performance of the position error signal in accordance with the movement of the laser light beam spot in the radius direction of the optical disk apparatus due to the change in rotational period of the optical disk apparatus depending on the position of the light beam spot in the radius direction, of the optical disk apparatus.

Further, the first and second conventional arts have a problem that when the position error signal is not repeatedly generated, a signal for driving the moving member does not necessarily compress the position error. In particular, when a phase of the position error signal is inverted, the position error is further deteriorated after one period.

For example, in consideration of a initial response of the position error signal according to the first conventional art, it is assumed that the amounts of position shift of the target member are Xi(1), Xi(2), and Xi(3) at first to third periods of the optical disk apparatus after starting the positioning control according to the first conventional art. Further, it is assumed that the relative position errors are Xe(1), Xe(2), and Xe(3) at the first to third periods. Since the position error signals are not added and accumulated at the first period of the rotation of the optical disk apparatus, the relative position error is expressed by the following formula, similarly to the case of using no first conventional art.

$$Xe(1)=Xi(1)/(1+G(s)) \quad (B1)$$

The position error signals at the first and second periods are added and accumulated into the signal delay unit at the second and third periods of the rotation of the optical disk apparatus. Therefore, formulae (B2) and (B3) are established.

$$Xe(2) = \{Xi(2) - Xi(1)\cdot G(s)/(1+G(s))\}/(1+G(s)) \quad (B2)$$

$$Xe(3) = \{Xi(3) - Xi(2)\cdot G(s)/(1+G(s)) - Xi(2)\cdot G(s)/(1+G(s))^2\}/(1+G(s)) \quad (B3)$$

If the amounts of position shift of the target member are equal at the first to third periods of the rotation of the optical disk apparatus, in other words, if the period of the position shift of the target member is maintained and a formula of [Xi(1)=Xi(2)=Xi(3)=Xi] is established, the formula (B2) is expressed by [Xe(2)=Xi/(1+G(s))2] and the formula (B3) is expressed by [Xe(3)=Xi/(1+G(s))3]. In other words, in a frequency range with a larger gain of [1+G(s)] than 1, the relative position error is compressed every period of the rotation of the optical disk apparatus.

However, if the phase of the position shift of the target member Is inverted at the second period of the disk rotation, namely, if the periodicity of the position shift of the target member is not maintained and a relationship of [Xi(1)=Xi(3)=Xi] and a relationship of [Xi(2)=−Xi] are established, the above formula (B3) is as follows.

$$Xe(3)=Xi[\{G(s)/(1+G(s))\}^2+1]/(1+G(s)) \quad (B4)$$

In the case of comparing the formula (B1) with the formula (B4), if the phase of the position shift is inversed at the second period, it will obviously be understood that in a frequency range with a larger gain of [1+G(s)] than 1, the amount of compression of the position error is deteriorated up to the half at the third period. Based on the formulae (B1) to (B4), the relative position error is represented every period of the disk rotation. Similarly, if the period of the position shift of the target member is not maintained only in the case of a part of the rotational phase of the disk rotation, the relative position error is partly deteriorated in the case of the part of the rotational phase of the disk after one period.

Although the phase inverse of the position shift of the target member has been described based on the formulae (1) to (4), equivalently, mixing of a signal asynchronous with the rotation of the optical disk to the amount of movement of the moving member also deteriorates the amount of compression of the position error. However, the amount of compression of the position error is decreased as the phase offset approaches the inverse phase though the phase is not inversed. Similarly, according to the second conventional art, in the positioning control apparatus comprising the means for adding and accumulating the position error signal, the amount of compression of the position error is deteriorated when the position error signal is not repeatedly generated.

Just after the control loop is closed, the period of the position error signal is not necessarily maintained. Specifically speaking, just after the control loop is closed, a response of the position error signal almost has frequency characteristics of the closed loop in the basic control unit. It does not necessarily reflect the periodicity of the position shift. Further, when an asynchronous disturbance oscillation is applied to the tracking controlling apparatus, the periodicity of the position error signal is not maintained.

According to the first and second conventional arts, components asynchronous with the frequency caused by repeating the periodic position shift deteriorate a compression ratio of the position error signal. For example, when a disturbance asynchronous with the frequency caused by repeating the periodic position shift is continuously applied, the signal components caused by the asynchronous disturbance might deteriorate the position error signal.

That is, according to the first and second conventional arts, the tracking can be improved without extremely increasing the gain of the basic control unit or the response frequency of the basic control unit. In addition, the position error having a frequency higher than a cut-off frequency of the basic control unit can be suppressed. However, the first and second conventional arts require the improvement.

Compression characteristics Gc1(s) of the position error signal are expressed by the following formula (C1) when the position error signal is not added and accumulated. Compression characteristics Gc2(s) of the position error signal are expressed by the following formula (C2) when the position error signal is added and accumulated. The compression characteristics of the position error signal are defined by transfer characteristics in a signal route to position error signal from the position shift of the target member.

$$Gc1(s)=1/\{1+G(s)\} \quad (C1)$$

$$Gc2(s)=1/\{1+G(s)/(1-e^{-Ls})\} \quad (C2)$$

where s=j×2πf, L: the amount of signal delay in the signal delay unit (the amount of delay: time), J: imaginary-number unit, and f: frequency.

The formula (C2) has a maximum value near an intermediate period of the amount of delay. In other words, when the frequency f in the formula (C2) has the maximum value near a frequency satisfying [f0=(2k+1)/2L (k=0, 1, 2, 3 . . . ). The formula (C2) is expressed by the formula (C3) when the frequency f=f0.

$$Gc2'(s)=1/\{1+G(s)/2\} \quad (C3)$$

In the case of comparing the formula (C1) with the formula (C3), within a frequency band having G(s) substantially larger than 1 (namely, frequency band having G(s) substantially smaller than the cut-off frequency of the basic control unit), the amount of compression is deteriorated to the half according to the first and second conventional arts.

In other words, according to the first and second conventional arts, in the case of the position shift of the target member at the intermediate period of the amount of delay, the amount of compression of the position error signal is deteriorated to the half.

In the optical disk apparatus, since the main frequency component of the position error signal is a rotational-period frequency of the optical disk apparatus or a harmonic component of the rotational period, the regularity of repetition of the position error signals can almost be held. However, the disturbance oscillation asynchronous with the rotational period might continuously be multiplied to the position error signal.

As one example of the asynchronous disturbance oscillation, there is a beat oscillation caused by a spindle motor for rotating and driving the optical disk. Further, as another example, there is an optical-head oscillation caused by a feed mechanism of an optical head by stick slip when moving the laser beam spot in the radius direction of the optical disk apparatus. Incidentally, the stick slip means the transition from static friction to dynamic friction or the transition reverse thereto.

The asynchronous disturbance oscillation is not mainly caused in the position shift or the radial movement of the optical-disk. However, it is mainly caused in the position error signal after tracking with high accuracy in accordance with the component synchronous with the rotation according to the first and second conventional arts. Therefore, the asynchronous disturbance oscillation degrades higher tracking accuracy.

In the optical disk apparatus, the asynchronous disturbance oscillation substantially exists as a lower frequency component, as compared with, mainly, the cut-off frequency in the basic control unit. Therefore, according to the first and second conventional arts, preferably, the remaining position error signal can be obtained without adding and accumulating the position error signal at the frequency band lower than the cut-off frequency in the basic control unit.

SUMMARY OF THE INVENTION

Accordingly, it is one object of the present invention to provide a positioning control apparatus and a positioning control method, in which, upon the position shift with a period, a relative position error caused in the tracking of the position is reduced without increasing both a gain of transfer characteristics of a control system and a frequency band and the relative position error is reduced even if the period of the position shift of a target member is changed, by using the periodicity of the position shift.

Further, it is another object of the present invention to provide a positioning control apparatus and a positioning control method, in which, upon the position shift with a period, the relative position error caused in the tracking of the position is reduced without increasing both the gain of transfer characteristics of the control system and the frequency band and the increase in the relative position error is prevented even if a component asynchronous with the period of the position shift is mixed in a position error signal.

Furthermore, it is another object of the present invention to provide a positioning control apparatus and a positioning control method, in which, upon the position shift with a period, the relative position error caused in the tracking of the position is reduced without increasing both the gain of transfer characteristics of the control system and a response frequency by using the periodicity of the position shift. In addition, it is another object of the present invention to provide a positioning control apparatus and a positioning control method, in which the increase in the relative position error is prevented even if a component asynchronous with the period of the position shift is mixed in a position error signal.

According to a first aspect of the present invention, there is provided a positioning control apparatus for controlling a moving member to trace the position of a target member which almost equally repeats the position shift at a predetermined period, comprising a position detector for detecting a relative position error between the moving member and a target position of the target member, a first adder for adding a delay signal and a position error signal which is outputted by the position detector, a signal delay unit for outputting the delay signal which is obtained by delaying an output of the first adder at a period corresponding to the position shift of the target member, a second adder for adding the position error signal and the delay signal, a filter having predetermined frequency characteristics, a third adder for adding an output of the second adder and the delay signal via the filter, a compensating unit for performing at least one of the compensation for offset and the compensation for stabilization of the positioning control apparatus by using a signal based on an output of the third adder, a drive unit for driving the moving member by a signal based on an output of the compensating unit, and a delay-amount setting unit for setting the amount of delay of a signal which is delayed by the signal delay unit.

According to a second aspect of the present Invention, there is provided a positioning control apparatus for controlling a moving member to trace the position of a target member which almost equally repeats the position shift at a predetermined period, comprising a position detector for detecting a relative position error between the moving member and the target member, a first adder for adding and outputting a delay signal and a position error signal which is outputted by the position detector, a signal delay unit for outputting the delay signal which Is obtained by delaying an output of the first adder at a period corresponding to the position shift of the target member, a second adder for adding and outputting the position error signal and the delay signal, a filter for subjecting the delay signal to filtering processing with predetermined frequency characteristics, a third adder for adding an output of the second adder and an output of the filter and outputting an addition signal, a compensating unit for performing at least one of the compensation for offset and the compensation for stabilization of the positioning control apparatus by using an output of the third adder as an input to the compensating unit, a drive unit for driving the moving member based on an output signal of the compensating unit, and a mode switching unit for switching a control mode.

According to a third aspect of the present invention, there is provided a positioning control apparatus for controlling a moving member to trace the position of a target member which repeats the position shift with an almost equal period, comprising a position detecting unit for detecting a relative position error between the moving member and a target position of the target member and outputting a position error signal, a first adder for generating an output signal based on the position error signal and a delay signal, a pass-band setting unit for passing only a predetermined frequency band from the output signal of the first adder, a signal delay unit for outputting the delay signal which is obtained by delaying an output signal of the pass-band setting unit by a period corresponding to the position shift, a second adder for generating an output signal based on the position error signal and the delay signal, a filter having predetermined frequency characteristics, a third adder for generating an output signal based on the delay signal via the filter and an output signal of the second adder, a compensating unit for performing the compensation for offset and/or the compensation for stabilization of the positioning control apparatus based on an output of the third adder, and a drive unit for driving the moving member based on an output signal of the compensating unit.

Other configurations and advantages of the present invention will obviously be understood in the following description of the present specification.

DESCRIPTION OF THE PREFERRED EMBODIMENTS

Hereinbelow, embodiments of the present invention will be described in detail with reference to the drawings.

First Embodiment

Figure 1:
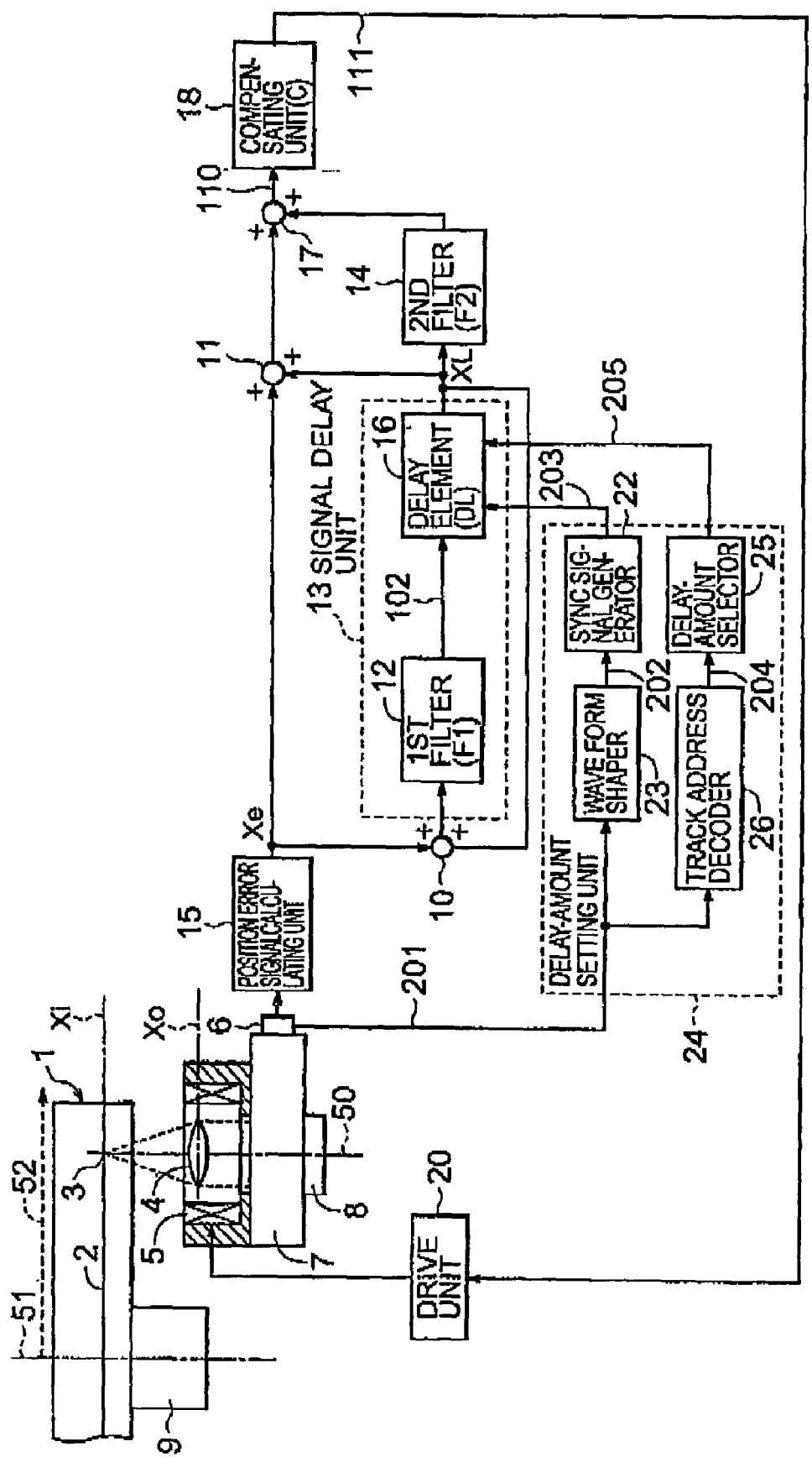
FIG. 1 is a block diagram showing the structure of a positioning control apparatus according to a first embodiment of the present invention.

FIG. 1 is a block diagram showing the structure of an axial tracking (focus position control) apparatus in an optical disk apparatus according to a first embodiment of the present invention.

Referring to FIG. 1, a basic control unit comprises a moving member, a position detector, a compensating unit, and a drive unit, which are serially combined, and has a signal route from a signal 110 to a signal Xe.

Further, referring to FIG. 1, laser beams outputted from a laser source 8 are irradiated to an optical disk 1 through an optical head 7 and an objective lens 4. A laser beam spot 3 as a focus position of the laser beams is displaced by driving a focus actuator 5 an optical direction 50 of the laser beams (by the amount of movement Xo of the moving member).

According to the first embodiment, the moving member comprises the focus actuator 5 and the objective lens 4 which move the laser beam spot 3.

One spindle motor 9 rotates the optical disk 1 at almost a predetermined period by using a controller of another spindle motor 9 (not shown). An information recording position 2 on the optical disk I as a target member repeatedly shifts the position thereof (shift Xi of the target position) in the optical direction 50 of the laser beams, almost equally at a predetermined period, in accordance with almost predetermined period. Reference numeral 51 in FIG. 1 denotes a rotational axis of the spindle motor 9, and reference numeral 52 in FIG. 1 denotes a radius direction of the optical disk 1.

A reflected light signal from the optical disk 1 is converted into an electronic signal by an optical detector 6 and is outputted to a position error signal calculating circuit 15. The position error signal calculating circuit 15 extracts and outputs a focus error signal from the output signal of the optical detector 6. The focus error signal is generally detected by a knife edge method, an astigmatic method, etc.

According to the first embodiment, the position detector comprises the laser source 8, the optical head 7, the optical detector 6, and the position error signal calculating circuit 15, which detect the focus error signal. A position error signal Xe comprises the focus error signal which is outputted by the position error signal calculating circuit 15.

In the axial tracking apparatus in the optical disk apparatus according to the first embodiment, a positioning control apparatus is formed so that the laser beam spot 3 traces the information recording position 2 on the optical disk 1.

Referring to FIG. 1, a first adding circuit 10 adds the position error signal Xe and a delay signal XL outputted by a signal delay unit 13, and outputs the addition signal to a first filter 12 in the signal delay unit t3. The first filter 12 subjects the output of the first adding circuit 10 to band limiting processing, and outputs the processing signal to a delay element 16. The delay element 16 outputs the delay signal XL which is obtained by delaying an output signal of the first filter 12 by a time L (the amount of signal delay) indicated by data on the amount of signal delay 205 outputted by a delay-amount setting unit 24 and a clock signal 203.

The delay element 16 may be any means which can obtain a predetermined signal delay. However, if the positioning controller comprises, for example, an analog controller, according to the first embodiment, simply, the delay element 16 using a CCD (Charge Coupled Device) is used. The CCD shifts an input signal 102 of the delay element 16 to the outside in accordance with a clock signal 205, and is like a shift register of an analog signal. The CCD can delay the signal corresponding to a period of the clock signal 205.

Mainly, the signal delay unit 13 according to the first embodiment comprises the delay element 16 and the first filter 12.

A second adding circuit 11 adds the position error signal Xe and the delay signal XL and outputs the addition signal. A second filter 14 subjects the delay signal XL to predetermined filtering processing and outputs the processing signal. Characteristics of the second filter 14 can be implemented without differentiation by serially combining a filter having inverse characteristics of the basic control unit and a low-pass filter having a degree equal to a relative degree of pole-zero of the basic control unit and a cut-off frequency wider than the cut-off frequency in the basic control unit.

A third adding circuit 17 adds an output of the second adding circuit 11 and an output of the second filter 14, and outputs the addition signal.

A compensating unit 18 outputs an output of the third adding circuit 17, and outputs a drive control signal 111 of the focus actuator 5.

The compensating unit 18 may be any unit for obtaining desired compensation characteristics for stabilization and desired compensation characteristics for offset.

The compensating unit 18 according to the first embodiment comprises an amplifier (gain) and a phase compensating filter obtained by serially combining a lead-lag filter comprising an analog element and a lag-lead filter comprising an analog element. The lead-lag filter implements the compensation for stabilization near the cut-off frequency of the basic control unit. The lag-lead filter implements the compensation for offset at a low frequency band near a resonant frequency of the focus actuator 5.

The drive unit 20 inputs a signal obtained by amplifying power of the drive control signal 111 to the focus actuator 5, and drives the focus actuator 5 in accordance with the drive control signal 111 to move the objective lens 4.

The drive unit 20 may be any drive unit which can freely drive the focus actuator 5. Incidentally, according to the first embodiment, the drive unit 20 comprises a power amplifier for setting the drive control signal 111 to a reference signal for a drive current of the focus actuator 5.

The focus actuator 5 receives an output of the drive unit 20 and moves the objective lens 4 in the direction of the optical axis 50 of the laser beams.

Next, a method for setting the amount of signal delay L will be described. According to the first embodiment, a description is given of an optical disk apparatus using the CLV recording format having an information recording sector having a fixed length.

A waveform shaper 23 shapes a waveform of the high-frequency data signal 201 which is read from the optical disk 1 and is outputted from the optical detector 6, detects a sector mark SM which is set at an address area of the information recording sector on the optical disk 1, and outputs the detected mark as a sector mark signal 202. A synchronous signal generator 22 outputs a clock signal 203 which is obtained by equally dividing the signal frequency synchronously with the sector mark signal 202.

A track address decoder 26 shapes a waveform of the high-frequency data signal which is outputted by the optical detector 6. Thereafter, the track address decoder 26 decodes a track address signal TA which is set to an address area in the information recording sector on the optical disk 1, and outputs the decoded signal as track address data 204. A delay-amount selector 25 previously stores the number of information recording sectors which exist within one-rotation phase of the optical disk 1 in the radius direction. In general, a track address and the number of information recording sectors included within one-rotation of the optical disk 1 at the position in the radius direction of the optical disk 1 of the track address are determined with one to one corresponding relationship based on recording format information of the optical disk 1. Further, the delay-amount selector 25 inputs track address data 204 which is outputted by the track address decoder 26, multiplies the number of information recording sectors within one-rotation of the optical disk 1 at the previously-stored track address and the dividing frequency of the sector mark signal SM in the synchronous signal generator 22, and outputs the signal as the data on the amount of signal delay 205.

According to the first embodiment, the delay-amount setting unit 24 comprises the waveform shaper 28, the synchronous signal generator 22, the track address decoder 26, and the delay-amount selector 25. The high-frequency data signal 201 forms a signal indicating a movement period of the target member, which is obtained from the target member.

The delay element 16 in the signal delay unit 13 outputs, as the delay signal XL, data in the delay element 16 which is shifted by the number of setting times set by the data on the amount of signal delay 205, from the data in the delay element 16, which is obtained by shifting the signal 102 in accordance with the clock signal 203. The number of shift steps which can be implemented by the signal delay unit 13 may be determined to be equal to a rotational period having the longest length of the optical disk 1, which is determined by the recording format of the optical disk 1.

Figure 2:
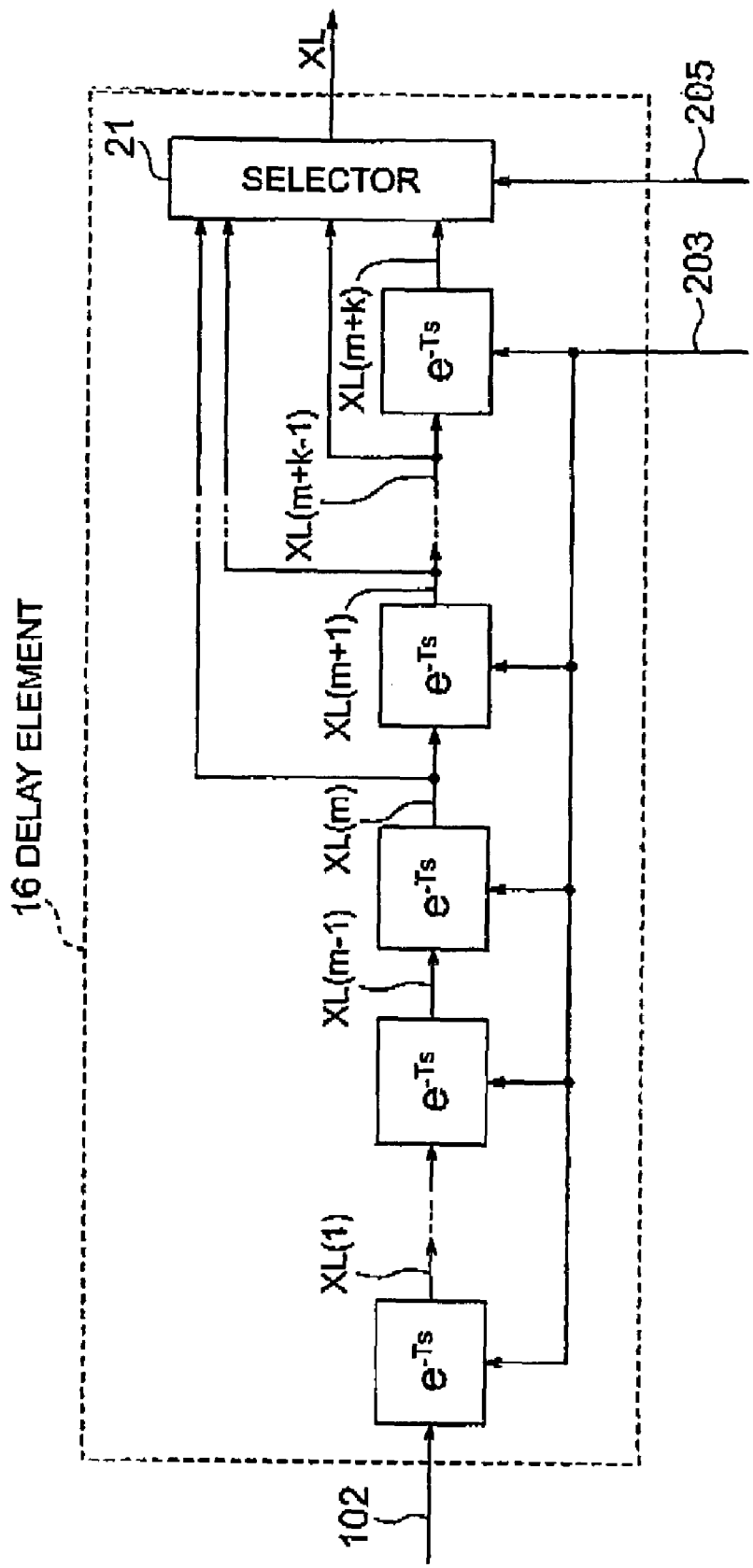
FIG. 2 is a block diagram for explaining the operation of the positioning control apparatus shown in FIG. 1.

A detailed description is given of the method for setting the amount of signal delay in the delay element 16 in the signal delay unit 13 with reference to FIG. 2. The signal 102 inputted to the delay element 16 is sequentially displaced to the output side in order of [XL(1)→XL(2)→. . . →XL(m−1)→XL(m)→XL(m+1)→. . . →XL(m+k),in accordance with the clock signal 203. Symbol T in FIG. 2 denotes a period of the clock signal 203.

The selector 21 selects one of the signals XL(m) to XL(m+k) based on the data on the amount of delay signal 205, and outputs the selection signal as the delay signal XL.

Referring to FIG. 2, the number of shifted signals m and (m+k) may be determined to be equal to the shortest rotational period or less, and to be equal to the longest rotational period or more, which are required by the optical disk 1.

According to the above method, a signal delayed almost equally to the rotational period of the optical disk 1 is selected as the delay signal XL, from the delay signals which are obtained by delaying the inputted signal 102 within the number of shifted signals (T×m) to [T×(m+k)]. Therefore, the amount of signal delay delayed by the signal delay unit 13 is approximately equal to the rotational period of the optical disk 1.

Even if the rotational period of the optical disk 1 is changed in accordance with the change in position of the laser beam spot 3 in the radius direction of the optical disk 1, the amount of signal delay is corrected based on the track address detected by the delay-amount setting unit 24. Thus, the amount of signal delay of the signal delay unit 13 is approximately equal to the rotational period of the optical disk 1.

The clock signal 203 is a signal which is approximately synchronous with the rotational phase of the optical disk 1 and, therefore, the signal delay unit 13 adds and accumulates the position error signal within one rotation of the optical disk 1 every rotational phase of the optical disk 1 at equal phase intervals.

Next, the operation of the first embodiment with the above-mentioned structure will be described.

Incidentally, transfer characteristics of the position detector (corresponding to a signal route from the amount of movement of the moving member Xo to the position error signal Xe, and transfer characteristics of the drive unit 20 are approximately normalized by 1.

Transfer characteristics P of the moving member can be approximated by a secondary phase delay system expressed by the following formula (A1), according to the first embodiment.

$$P(s)=348/(s^2+21.9s+1.14\times 10^5) \text{ (unit: } m/A\text{)} \quad (A1)$$

The transfer characteristics C(s) of the compensating unit 18 are set as the following formula (A2) according to the first embodiment. Therefore, transfer characteristics of the basic control unit (transfer characteristics G(s)) are expressed by the following formula (A3). The cut-off frequency of the basic control unit can be obtained near a frequency of 2 kHz. Further, according to the first embodiment, the basic control unit has delay characteristics of a phase near −180° at the cut-off frequency in the basic control unit. Thus, compression performance of the position error cannot be obtained by a frequency of 2 kHz or more.

$$C(s) = 2\times 10^6 \times \{(s+1,741)/(s+326)\}\times \{(s+3,141)/ \quad (A2)$$
$$(s+50,265)\}$$

$$G(s) = C(s)P(s) \quad (A3)$$

Transfer characteristics F(s) of the second filter 14 are expressed by the following formula (A4). Thereby, the transfer characteristics F(s) have characteristics almost equal to inverse characteristics of the basic control unit, near the cut-off frequency of the basic control unit according to the first embodiment and within a part of a frequency band higher than the cut-off frequency. Inverse characteristics P(s)−1 of the moving member included in G(s)−1 may use approximate characteristics of the moving member, which is previously obtained experimentally.

$$F(s)=G(s)^{31\ 1}\times \{3.14\times 10^5/(s+3.14\times 10^5)\}^2 \quad (A4)$$

A limiting band in the transmission characteristics of the first filter 12 is set to a frequency of 6 kHz which is higher than the cut-off frequency of 2 kHz of the basic control unit according to the first embodiment and the following formula (A5) is obtained.

$$Fi(s)=3.77\times 10^4/(s+3.77\times 10^4) \quad (A5)$$

By setting the above formulae (A1) to (A5), the positioning control apparatus according to the first embodiment can be formed of the positioning controller according to the second conventional art. The converging condition of the position error signal expressed by the following formula (A6) can be satisfied according to the second conventional art. Advantageously, the position error component synchronous with the rotation of the optical disk 1 is compressed over the cut-off frequency (2 kHz) of the basic control unit, which is not obtained by the first conventional art. Reference symbol |X| denotes a gain of X.

$$|1+G(s)|>|1-G(s)F(S)|\cdot|Fi(s)| \quad (A6)$$

Figure 3:
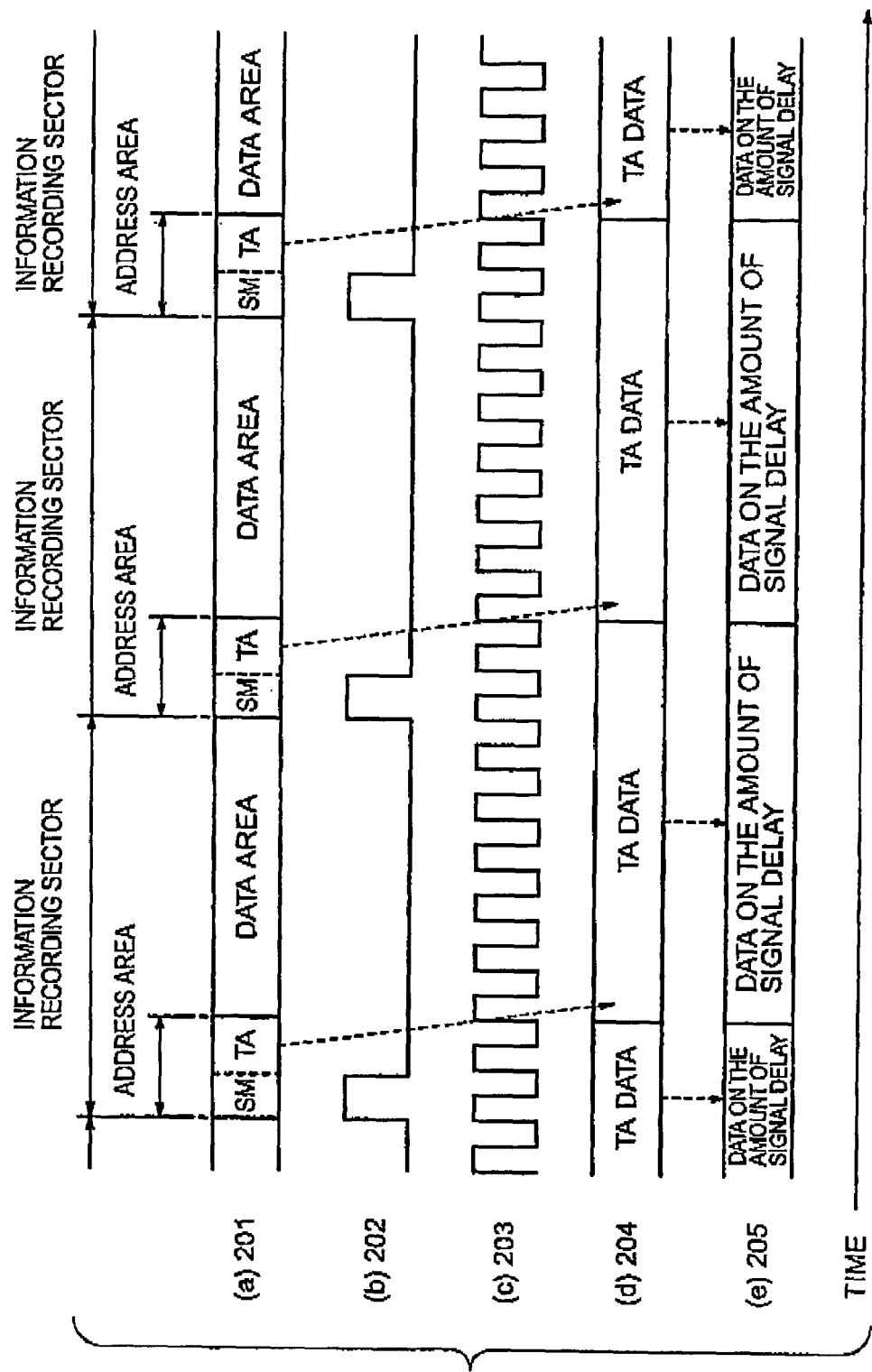
FIG. 3 is an operational waveform diagram for explaining the operation of the positioning control apparatus shown in FIG. 1.

Next, a description is given of the operation for setting the amount of signal delay to the signal delay unit 13 according to the first embodiment with reference to FIG. 3.

The waveform shaper 23 extracts the sector mark SM arranged to the address area at the head of the information recording sector on the optical disk 1 from the high-frequency data signal 201 which is read and outputted by the optical detector 6, and outputs the sector mark signal 202 as a pulse signal synchronous with the sector mark. The synchronous signal generator 22 outputs the clock signal 203 which is synchronous with a leading edge of the sector mark signal 202 and is divided into 8 blocks every sector. The track address decoder 26 decodes the track address (TA) included in the high-frequency data signal 201, and outputs the decoded signal as the track address data signal 204. The delay-amount selector 25 inputs the track address data signal 204, multiplies the number of frequency division of the sector mark signal 202 in the synchronous signal generator 22 and the number of information recording sectors within one-rotation phase of the optical disk 1 in the radius direction of the optical disk 1 in which the inputted track address data 204 is positioned, and outputs the multiplying result as the data on the amount of signal delay 205. If the number of information recording sectors in the radius direction of the optical disk 1 at the track address is determined as 50 by the recording format of the optical disk 1, a multiplying result 400 of the number of frequency divisions of the sector mark signal 8 and the number of information recording sectors 50 is outputted as the data on the amount of signal delay 205 according to the first embodiment.

The delay element 16 outputs, as the delay signal XL, the signal which is obtained by displacing the signal 102 to the output side 400 times in accordance with the clock signal 203.

Referring to FIG. 3, the number of frequency divisions of the sector mark signal is 8. However, according to the above method, preferably, the minimum number of frequency division is obtained and set experimentally to obtain desired compression performance of the position error signal. For example, if the cut-off frequency expressed by the formula (A3), of the basic control unit is set to approximately 2 kHz and the compressing characteristics of the position error is improved near the cut-off frequency of the basic control unit, preferably, the number of frequency divisions of the sector mark signal is set so that the period of the clock signal 203 is equal to a frequency of ten to twenty times or more of the cut-off frequency in the basic control unit, namely, is equal to 20 to 40 kHz or more within the desired rotational period range of the optical disk 1.

Referring to FIG. 3, the number of information recording sectors included within the one-rotation phase of the optical disk 1 is an integer number. However, it is assumed that the head of the information recording sector on the information recording track adjacent the same rotational phase position of the optical disk 1 does not exist on the same phase depending on the recording format of the used optical disk 1. That is, it is assumed that the number of information recording sectors included within the one-rotation phase of the optical disk 1 is not an integer number. In such a case, the number of frequency divisions of the sector mark is increased and the error of the amount of signal delay is reduced per clock of the clock signal 203. Thus, advantageously, the position error is sufficiently obtained by using the data on the amount of signal delay 205 having an approximately integer number.

Second Embodiment

Figure 4:
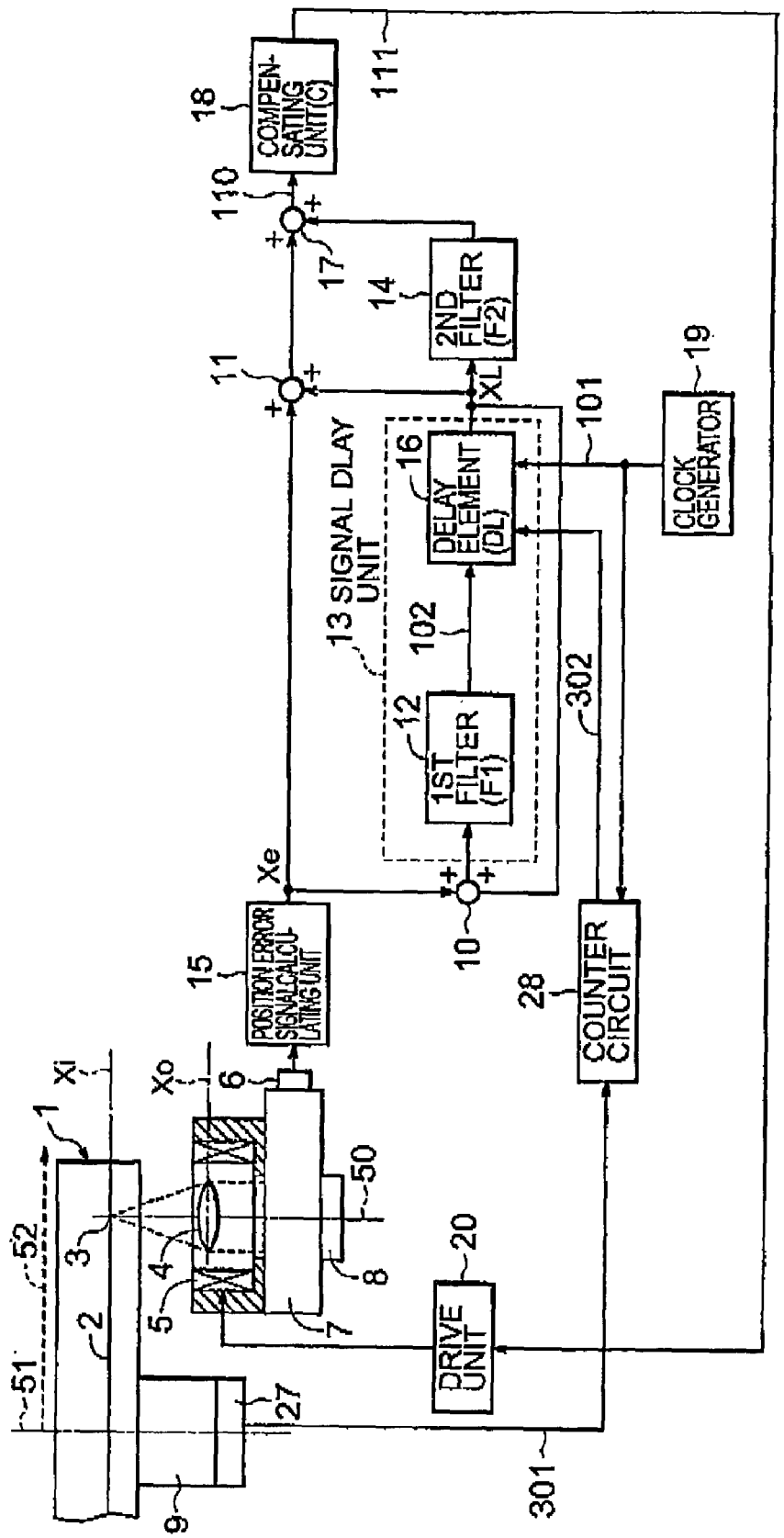
FIG. 4 is a block diagram showing the structure of a positioning control apparatus according to a second embodiment of the present invention.

According to the first embodiment, the clock signal 203 and the data on the amount of signal delay 205 which are inputted to the delay element 16 in the signal delay unit 13 are set based on the reflected light signal from the optical disk 1. More simply, the same advantage can be obtained with the structure shown in FIG. 4 as an example. The difference between FIGS. 4 and 1 will be described.

A clock signal 101 with a fixed period, which is outputted from the clock generator 19, Is inputted to the delay element 16 and a counter circuit 28. A motor rotational phase detecting signal (FG signal) 301 which is detected by a hole element 27 incorporated in a three-phase blushless motor used as the spindle motor 9 and formed into 2 values by a comparator circuit (not shown) is inputted into the counter circuit 28. The counter circuit 28 counts the number of clocks of the clock signal 101 corresponding to one period of the rotation of the optical disk 1 based on the FG signal, and outputs the counting result as data on the amount of signal delay 302.

According to the second embodiment, the delay-amount setting unit mainly comprises the hole element 27, the counter circuit 28, and the clock generator 19.

The delay element 16 outputs, as the delay signal XL, an inner signal of the delay element 16 which is shifted to the output side by the number of times set by the data on the amount of signal delay 302, from the inner signals in the delay element 16 which are obtained by shifting the signal 102 to the output side in accordance with the clock signal 101.

Figure 5:
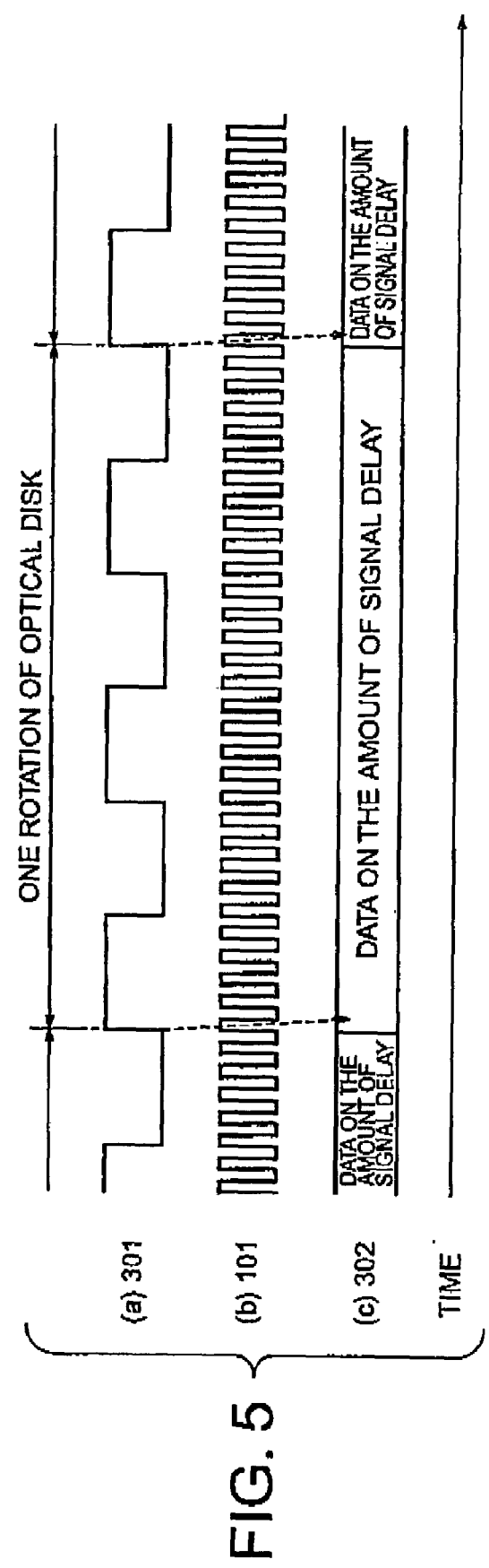
FIG. 5 is an operational waveform diagram for explaining the operation of the positioning control apparatus shown in FIG. 4.

FIG. 5 is a diagram showing the operation waveform for explaining the operation according to the second embodiment. The FG signal 301 becomes a pulse signal with three periods per rotation of the optical disk 1. The counter circuit 28 counts the number of clocks (30 clocks In FIG. 5) of the clock signal 101 corresponding to the three periods of the FG signal 301, and outputs the counting result as the data on the amount of signal delay 302 every rotational period of the optical disk 1. The delay element 16 outputs, as the delay signal XL, the inner signal of the delay element 16, which is obtained by shifting the signal 102 to the output side by 30 times in accordance with the clock signal 101.

According to the first embodiment, the clock for delaying the signal in the signal delay unit corresponds to the signal which is almost synchronous with the phase of the rotation of the optical disk 1. However, differently from the first embodiment, in the structure according to the second embodiment, the clock for delaying the signal in the signal delay unit has a fixed period. That is, the rotational phase of the optical disk 1 is inputted to the delay element 16 at equal time intervals. Consequently, it is possible to vary the amount of signal delay in the signal delay unit depending on the change in rotational period of the optical disk 1, irrespective of the recording format of the optical disk 1. The signal delay unit 13 adds and accumulates the position error signal within one rotation of the optical disk 1 at the equal time interval.

The number of clocks of the clock signal 101 is set to 30 per rotation of the optical disk 1 with reference to FIG. 5. However, preferably, the minimum number of clocks is obtained experimentally to obtain predetermined position error compressing characteristics at a desired frequency and the obtained number of clocks is set to the period of the clock signal 101. For example, if the cut-off frequency of the basic control unit expressed by the formula (A3) is set to approximately 2 kHz and the compression performance of the position error signal is improved at the approximate cut-off frequency in the basic control unit, preferably, the period of the clock signal 101 is equal to a frequency of 10 to 20 times of the cut-off frequency in the basic control unit or more, namely, is equal to 20 to 40 kHz or more.

The period of the one-rotation of the optical disk 1 is an integer multiple of the period of the clock signal 101 with reference to FIG. 5. If it is not an integer multiple, the position error signal having a phase offset of one period of the clock signal 101 is added and accumulated in the signal delay unit 13 at the maximum level for the rotational phase of the optical disk 1. In such a case, the period of the clock signal 103 Is shortened and the error of the phase offset per clock is reduced. Thus, advantageously, the position error is sufficiently compressed.

The FG signal outputted by the hole element is used to detect the rotational phase of the spindle motor 9 with reference to FIG. 5. However, it is advantageous to use a motor rotational phase signal outputted by an optical rotary encoder to which the spindle motor 9 and the rotational axis 51 are arranged similarly.

Third Embodiment

Figure 6:
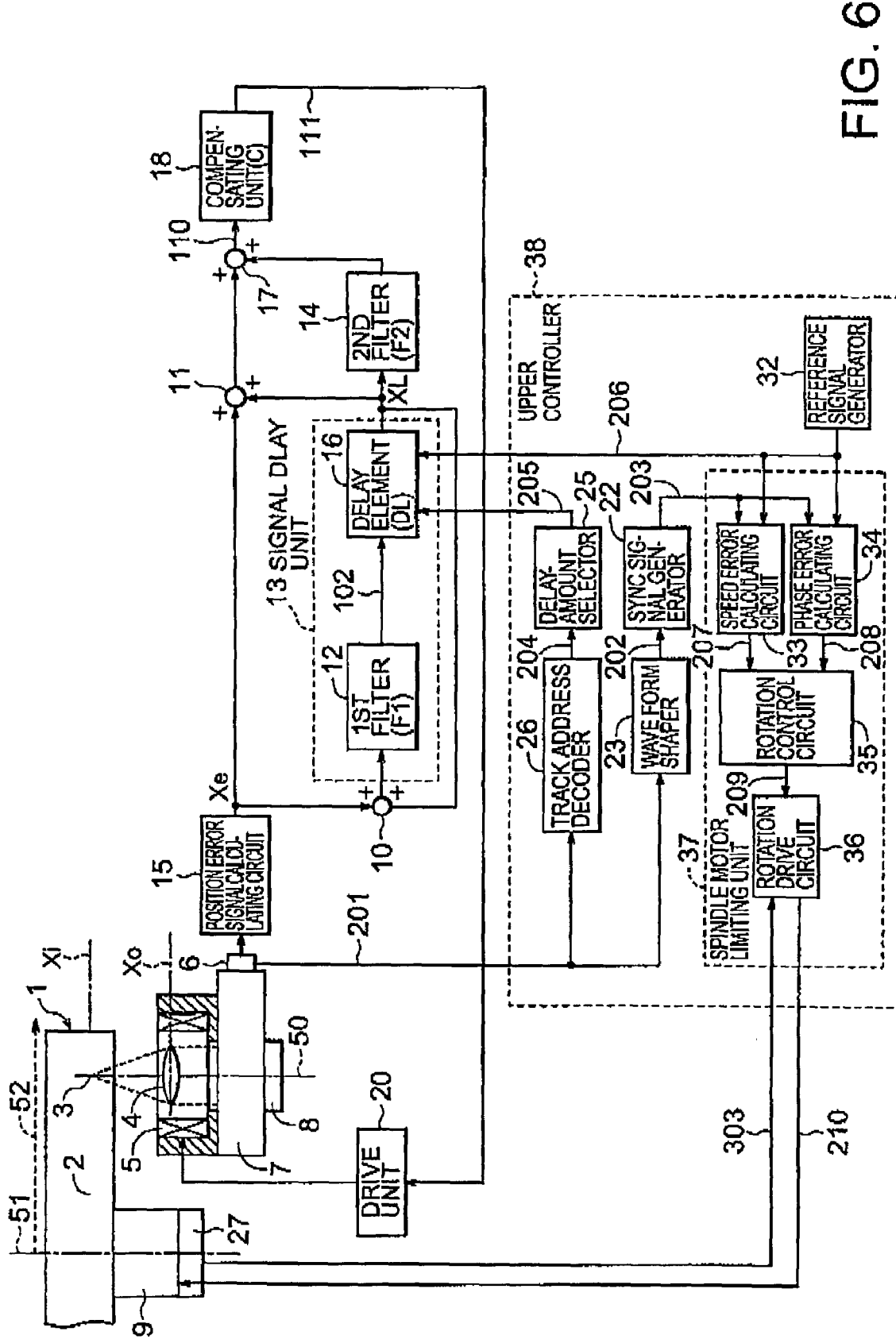
FIG. 6 is a block diagram showing the structure of a positioning control apparatus according to a third embodiment of the present invention.

FIG. 6 is a block diagram showing the structure of a positioning control apparatus according to a third embodiment of the present invention.

The delay-amount setting unit comprises the waveform shaper 23, the synchronous signal generator 22, the track address decoder 26, and the delay-amount selector 25 according to the first embodiment.

As a feature according to the third embodiment, referring to FIG. 6, a delay-amount setting unit comprises an upper controller 38 which perform the operation for controlling the rotation of the spindle motor 9 and the operation for recording and reading information in an optical disk apparatus, the spindle motor 9, and the hole element 27.

The upper controller 38 comprises the waveform shaper 23, the synchronous signal generator 22, the track address decoder 26, the delay-amount selector 25, a spindle motor control unit 37, and a reference signal generator 32. The spindle motor control unit 37 comprises a speed error calculating circuit 33, a phase error calculating circuit 34, a rotation control circuit 35, and a rotation drive circuit 36.

The clock signal 203 outputted from the synchronous signal generator 22 is inputted to the speed error calculating circuit 33 and the phase error calculating circuit 34 which are incorporated in the spindle control unit 37. A reference clock signal 206 outputted from the reference signal generator 32 is inputted to the speed error calculating circuit 33 and the phase error calculating circuit 34. The delay element 16 in the signal delay unit 13 sequentially displaces the signal 102 inputted from the delay element 16 to the output side in accordance with the reference clock signal 206. The delay element 16 outputs the inner signal of the delay element 16, which is obtained by shifting the signal 102 inputted from the delay element 16 to the output side by the number of times indicated by the data on the amount of signal delay 205.

The speed error calculating circuit 33 calculates a frequency error (rotational speed error of the optical disk 1) of the clock signal 203 from the reference clock signal 206, and outputs the calculating result as a rotational speed error signal 207. The phase error calculating circuit 34 calculates a phase offset (rotational phase offset of the optical disk 1) of the clock signal 203 from the reference clock signal 206, and outputs the calculating result as the rotational phase error signal 208. The rotation control circuit 35 calculates and outputs a rotation control signal 209 which implements at least one of the compensation for stabilization and the compensation for offset in the control for rotation of the spindle motor 9, based on the speed error signal 207 and the phase error signal 208. The rotation drive circuit 36 inputs the rotation control signal 209 and a motor rotational phase detecting signal 303, and outputs the rotation drive signal 210 which is obtained by modulating the rotation control signal 209 in accordance with the motor rotational phase detecting signal 303 and by amplifying power of the modulated signal. The spindle motor 9 rotates the optical disk 1 around the rotational axis 51 of the spindle motor 9 in accordance with the rotation drive signal 210.

The speed error calculating circuit 33 may be any circuit for obtaining the desired speed error signal 207. The speed error calculating circuit 33 according to the third embodiment converts frequencies of the reference clock signal 206 and the clock signal 203 into voltages thereof, and obtains the speed error signal 207 by calculating the difference after high-pass filtering processing. The phase error calculating circuit 34 may be any circuit for obtaining the desired phase error signal 208. However, the phase error calculating circuit 34 according to the third embodiment obtains the phase error signal 208 by low-pass filtering processing of output signals of the reference clock signal 206 and the clock signal 203 via an edge-controlled Flip-Flop phase comparator.

The rotation control circuit 35 may be any circuit for obtaining desired performance in the control for the rotation of the spindle motor 9. According to the third embodiment, by multiplying a predetermined gain which is previously obtained experimentally to the speed error signal 207 and the phase error signal 208, adding the resultant signals and by thereafter outputting the resultant signal as the rotation control signal 209, the spindle motor 9 has a rotational control system using state feed-back in which the clock signal 203 is outputted from the control system and the reference clock signal 206 is inputted as a reference input signal to the control system. Thus, the rotation of the spindle motor 9 is controlled so that the clock signal 203 traces the reference clock signal 206.

The rotation drive circuit 36 may be any circuit for freely rotating and driving the spindle motor 9 in accordance with the rotation control signal 209. According to the third embodiment, the rotational phase of the spindle motor 9 is detected by using the hole element 27 incorporated in the three-phase blushless motor used as the spindle motor 9. The rotation control signal 209 is modulated by using the sine-curved rotational phase detecting signal 303 which is outputted by the hole element 27. A power amplifier amplifies power of the modulated signal.

With the structure of the third embodiment, the rotation control system of the spindle motor 9 is formed so that the rotational phase and period of the optical disk 1 match the clock signal 206. Therefore, the amount of signal delay in the signal delay unit 13 for delaying the signal in accordance with the clock signal 206 is approximately equal to the rotational period of the optical disk 1, irrespective of the rotational period of the optical disk 1. When the rotational period of the optical disk 1 is varied depending on the change In position of the laser beam spot 3 in the radius direction of the optical disk 1, the rotational period of the optical disk 1 is varied by changing the period of the reference clock signal 206. Consequently, the amount of signal delay in the signal delay unit 13 is approximately equal to the rotational period of the optical disk 1.

Fourth Embodiment

Figure 7:
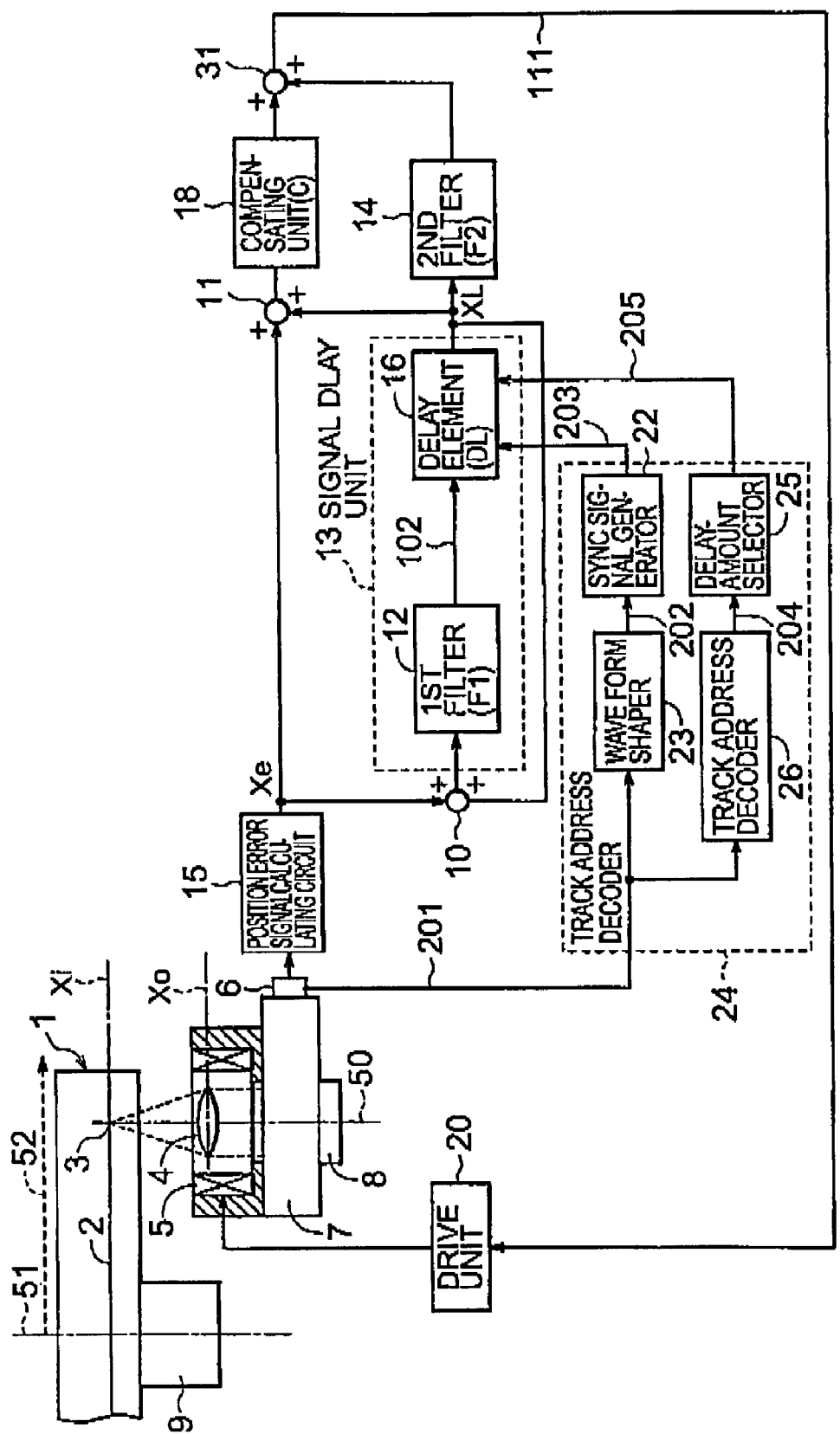
FIG. 7 is a block diagram showing the structure of a positioning control apparatus according to a fourth embodiment of the present invention.

FIG. 7 is a block diagram showing the structure of a positioning control apparatus according to a fourth embodiment of the present invention.

The output of the second filter 14 is added to the input side of the compensating unit 18 by using the third adding circuit 17 in FIG. 1 according to the first embodiment.

However, there is a feature according to the fourth embodiment that characteristics of the second filter 14 are replaced with the following formula (A7) and the output of the second filter 14 is added to the output side of compensating unit 18 by using a fourth adder 31 and an output of the fourth adder 31 is inputted to the drive unit 20.

A filter based on the formula (A7) has inverse characteristics of the moving member near the cut-off frequency of the basic control unit and within a part of a frequency band higher than the cut-off frequency. Therefore, if the focus actuator 5 is driven by the delay signal XL via the second filter 14, the amount of movement of the moving member is equal to the amount of position shift indicated by the delay signal XL near the cut-off frequency signal and within a part of the frequency band higher than the cut-off frequency.

As mentioned above, obviously, it is advantageous to compress the position error even in the positioning control apparatus shown in FIG. 7 equivalent to that shown in FIG. 1.

$$F(s)=P(s)^{-1}\times\{3.14\times10^5/(s+3.14\times10^5)\}^2 \quad (A7)$$

The positioning control apparatus comprises, for example, the analog control system according to the first to fourth embodiments. However, advantageously, the positioning control apparatus comprises a digital control system.

For example, a description is added with reference to FIG. 1 according to the first embodiment. When the positioning control apparatus in FIG. 1 comprises the digital control system, the position error calculating circuit 15 includes an A/D (Analog to Digital) converter and data on the position error signal after A/D conversion is outputted as the position error signal. Each of the first filter 12, the second filter 14, and a compensating unit 18 for stabilization comprises a digital filter synchronous with a sampling clock which is outputted by a sampling clock generating circuit (not shown). The delay element 16 comprises a shift register which is operated by the clock signal 203. The compensating unit 18 includes a D/A (Digital to Analog) converter. The compensating unit 18 D/A converts a signal which is subjected to calculation for compensation. Then, the drive unit 20 amplifies power of the converted signal and, thereafter, the amplified signal may be applied and inputted to the focus actuator 5.

Advantageously, the positioning control apparatus comprises a highbred control system mixedly including the analog control system and the digital control system.

A description is added with the structure in which only the delay element 16 in the signal delay unit 13 comprises the digital control system with reference to FIG. 1 according to the first embodiment. An A/D converter (not shown) converts the signal 102 into digital data and the delay element 16 comprises a shift register for shifting the signal 102 after the A/D conversion to the output side in accordance with the clock signal 203. A D/A converter (not shown) may convert output data of the delay element 16 to an analog signal and may output the converted signal as the delay signal XL.

Fifth Embodiment

Figure 8:
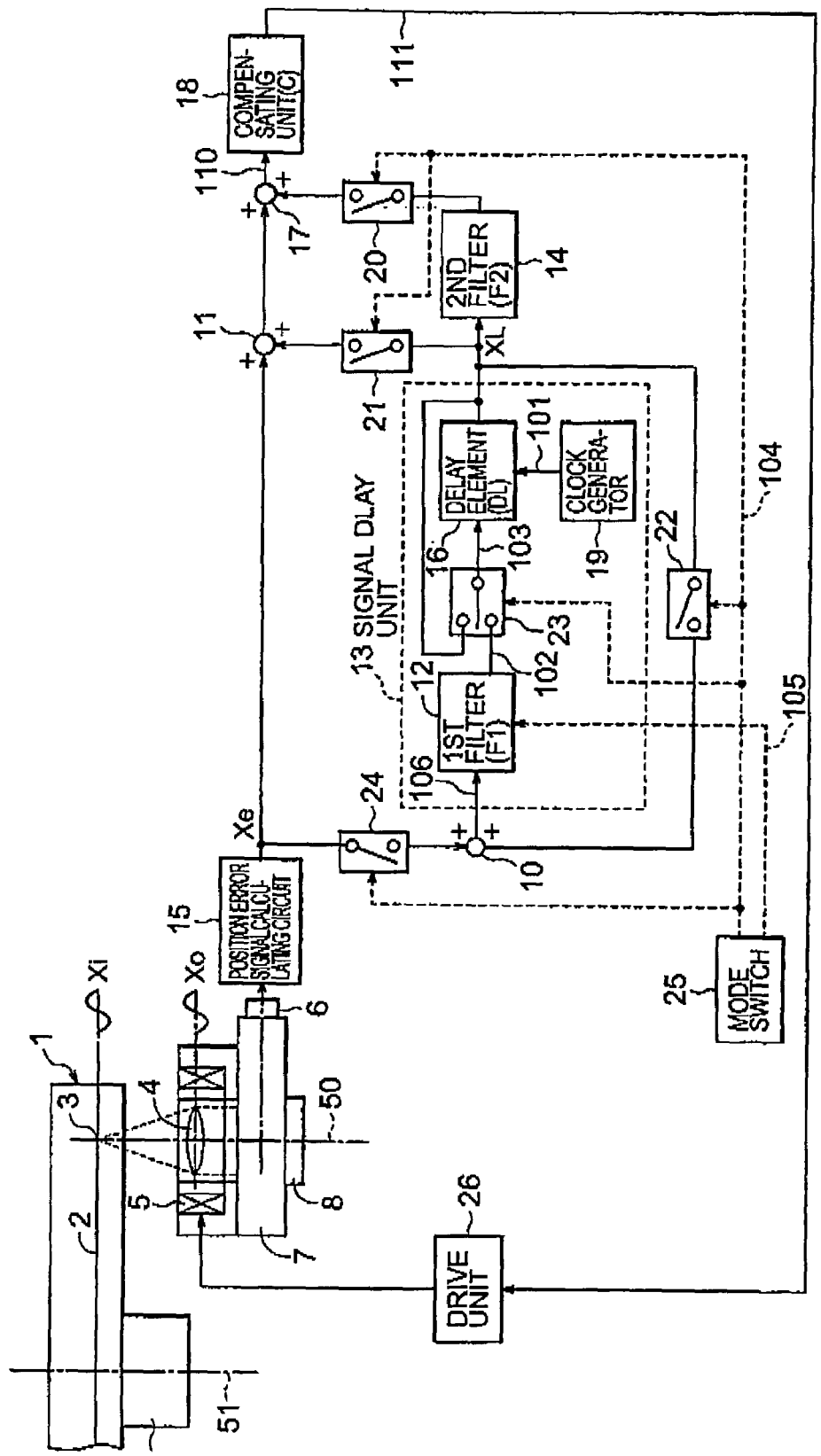
FIG. 8 is a block diagram showing the structure of a positioning control apparatus in an optical disk apparatus according to a fifth embodiment of the present invention.

FIG. 8 Is a block diagram showing the structure of a positioning control apparatus [focus position control (focus servo) apparatus] in an optical disk apparatus according to a fifth embodiment of the present invention. According to the fifth embodiment, a basic control unit comprises the moving member, and a position detector, a compensating unit, and a drive unit that will be described later, which are serially combined, with a signal route from the signal 110 to the delay signal Xe.

The laser beams outputted from the laser source 8 are irradiated to an optical disk 1 through an optical head 7 and an objective lens 4. The laser beam spot 3 as a focus position of the laser beams is shifted by driving the focus actuator 5 and moving the objective lens 4 In the optical axis direction 50 of the laser beams. According to the fifth embodiment, the moving member comprises the focus actuator 5 and the objective lens 4 which move the laser beam spot 3. Reference symbol Xo denotes the amount of movement of the moving member in the optical direction.

The spindle motor 9 rotates the optical disk 1 at an almost constant period in accordance with the operation of a controller (not shown) of the spindle motor 9. The information recording position 2 on the optical disk 1 almost equally repeats the position shift at an approximately constant period in the optical direction 50 of the laser beams in accordance with the rotation of the optical disk 1. According to the fifth embodiment, the information recording position 2 is a target member. Reference symbol Xi denotes the position shift in the optical direction of the target member. incidentally, reference numeral 51 denotes the rotational axis of the spindle motor 9 in FIG. 8.

A reflected light signal from the optical disk 1 is converted into an electronic signal by the optical detector 6 via the objective lens 4 and the optical head 7, and is outputted to the position error signal calculating circuit 15. The position error signal calculating circuit 15 extracts the focus error signal from the output signal of the optical detector 6, and outputs the extracted signal. The focus error signal is generally detected by a knife edge method, an astigmatic method, etc.

According to the fifth embodiment, the position detector comprises the laser source 8, the optical head 7, the optical detector 6, and the position error signal calculating circuit 15, which detect the focus error signal. The focus error signal outputted by the position error signal calculating circuit 15 is the position error signal Xe. The axial tracking apparatus in the optical disk apparatus according to the fifth embodiment comprises a positioning control apparatus for tracking the laser beam spot 3 to the information recording position 2 on the optical disk 1.

A first adder 10 adds the position error signal Xe outputted via the first switch 24 from the position error signal calculating circuit 15 and the delay signal XL outputted via the third switch 22 from the signal delay unit 13, which will be described later, and outputs the addition result as a signal 106. The signal delay unit 13 mainly comprises the first filter 12, a second switch 23, the delay element 16, and the clock generator 19.

The first filter 12 in the signal delay unit 13 subjects the signal 106 outputted from the first adder 10 to band limiting processing, and outputs the signal 102 after the band limiting processing to the second switch 23. The second switch 23 selects any of the signal 102 outputted from the first filter 12 and the delay signal XL outputted from the delay element 16, and outputs the selected signal 103 to the delay element 16.

The delay element 16 outputs the delay signal XL obtained by delaying the signal 103 by a time L which is almost equal to the period of the rotation of the optical disk 1. The delay element 16 may be any element for obtaining predetermined signal delay. According to the fifth embodiment, for example, if the positioning control apparatus comprises an analog control apparatus, simply, a CCD (Charge Coupled Device) is used for the delay element 16.

The CCD is one of shift registers of an analog signal, and shifts the inputted signal 103 to the output side in accordance with the clock signal 101 outputted from the clock generator 19, thereby delaying the signal corresponding to the period of the clock signal 101.

The second adder 11 adds the position error signal Xe outputted from the error signal calculating circuit 15 and the delay signal XL outputted via the fourth switch 21 from the delay element 16, and outputs the addition signal.

The second filter 14 subjects the delay signal XL to predetermined filtering processing, and outputs the processing result. Characteristics of the second filter 14 can be implemented without differentiation by serially combining a filter having inverse characteristics of the basic control unit and a low-pass filter having a degree equal to a relative degree of pole-zero of the basic control unit and a cut-off frequency wider than a cut-off frequency of the basic control unit. The third adder 17 adds a signal outputted from the second adder 11 and a signal outputted via a fifth switch 20 from the second filter 14, and outputs the addition signal as the signal 110.

The compensating unit 18 inputs the signal 110 outputted from the third adder 17, and outputs the drive control signal 111 for driving the focus actuator 5 so that the laser beam spot 3 is traced to the information recording position 2. The compensating unit 18 may be any unit for obtaining desired compensation characteristics for stabilization or compensation characteristics for offset. The compensating unit 18 according to the fifth embodiment comprises an amplifier (gain) and a phase compensating filter obtained by serially combining a lead-lag filter comprising an analog element and a lag-lead filter.

The lead-lag filter implements the compensation for stabilization near the cut-off frequency of the basic control unit. The lag-lead filter implements the compensation for offset at a low frequency band near a resonant frequency of the focus actuator 5.

A drive unit 26 outputs a signal obtained by amplifying power of the drive control signal 111, and drives the focus actuator 5 in accordance with the drive control signal 11. The drive unit 26 may be any drive unit which can freely drive the focus actuator 5. Incidentally, the drive unit 26 according to the fifth embodiment comprises a power amplifier for setting the drive control signal 111 to a reference signal for a drive current of the focus actuator 5.

The focus actuator 5 receives an output signal of the drive unit 26 and moves the objective lens 4 in the optical axis direction 50 of the laser beams. A mode switch 25 outputs a band switch signal 105, and controls the operation for switching a limiting band of the first filter 12. The mode switch 25 outputs a switch control signal 104, and controls the operation for switching first to fifth switches 24 to 20 in accordance with the operating status of the optical disk apparatus.

According to the fifth embodiment, a mode switching unit comprises the first switch 24, the second switch 23, the third switch 22, the fourth switch 21, the fifth switch 20, and the mode switch 25, which switch the signal, and the first filter 12 which changes the frequency characteristics of the signal delay unit 13.

The mode switching unit includes means for changing the frequency characteristics of the signal delay unit 13 which comprises the first filter 12 and the mode switch 25. The first filter 12 switches the cut-off frequency based on the band switch signal 105 which is outputted by the mode switch 25. The frequency characteristics of the signal delay unit 13 vary by changing the cut-off frequency of the first filter 12.

A method for switching the cut-off frequency of the first filter 12 may be any method for obtaining a predetermined cut-off frequency. Incidentally, according to the fifth embodiment, when the positioning control apparatus comprises an analog control apparatus, simply, it has the structure shown in FIG. 9.

Figure 9:
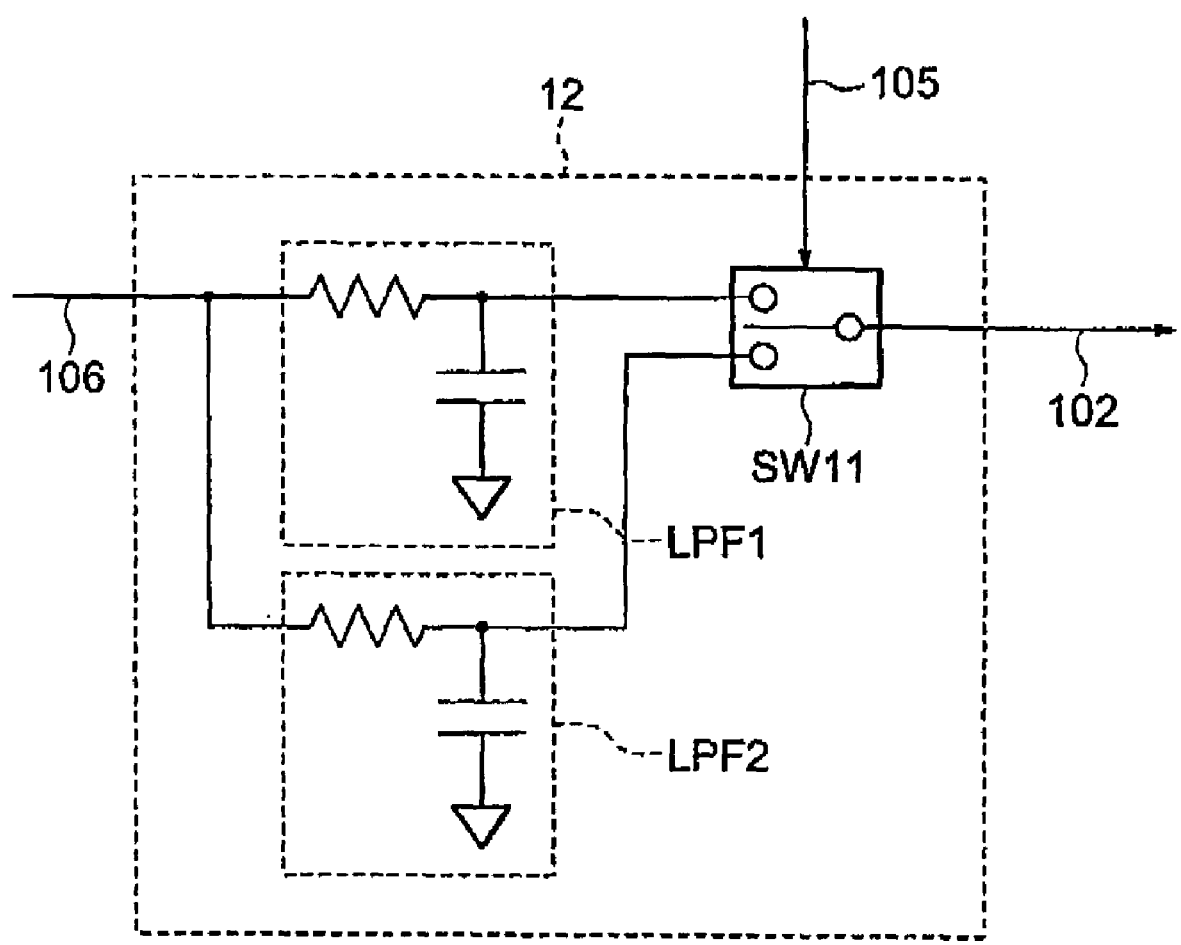
FIG. 9 is a block diagram showing the structure of a first filter according to the fifth embodiment of the present invention.

Referring to FIG. 9, the first filter 12 comprises two low-pass filters LPF1 and LPF2 each of which comprises a resistor element and a capacitor element with different cut-off frequencies, and a switch SW11. The signal 106 inputted to the first filter 12 is inputted to the low-pass filters LPF1 and LPF2. Output signals of the low-pass filters LPF1 and LPF2 are inputted to the switch SW11. Any of the output signals of the low-pass filters LPF1 and LPF2 is selected by the band switch signal 105 inputted to the switch SW11, and the selected signal is outputted from the switch SW11. The output signal of the switch SW11 is set as the signal 102 outputted from the first filter 12.

When many cut-off frequencies are switched and used by the first filter 12, a low-pass filter using a switch capacitor filter (SCF) is simple. The SCF changes the cut-off frequency of the filter in accordance with the switching period of the incorporated capacitor. The band switch signal 105 outputted by the mode switch 25 becomes a clock signal which switches the SCF. The cut-off frequency is obtained in accordance with the clock period of the band switch signal 105 by changing the clock period of the band switch signal 105.

The mode switching unit includes means for on/off operation of inputting the output of the second filter to the third adder 17. The means for on/off operation comprises the fifth switch 20 and the mode switch 25. The mode switching unit includes means for on/off operation of inputting the delay signal XL to the first adder 10 and means for on/off operation of inputting the delay signal XL to the second adder 11. These means for on/off operation comprises the third switch 22, the fourth switch 21, and the mode switch 25, respectively.

The mode switching unit includes state holding means for holding an inner state of the signal delay unit 13 which comprises the first switch 24, the second switch 23, the third switch 22, and the mode switch 25. During the selection of the delay signal XL by the second switch, information on the position error signal Xe added and accumulated in the delay element 16 is circulated in the delay element 16 at the period of the time L. The delay element 16 outputs the same signal at the period of the time L.

Therefore, the inner state of the signal delay unit 13 is held at the period of the time L by switching off the first switch 24, selecting the delay signal XL by the second switch 23, and switching on the third switch 22. Since the delay element 16 outputs the same signal at the period of the time L, the inner state of the first filter 12 is held at the period of the time L. When the inner state of the signal delay unit 13 is held, the inner state of the second filter 14 is held at the period of the time L.

After starting the positioning control apparatus according to the fifth embodiment, when the inner state of the signal delay unit 13 reaches a stable state, the inner state of the signal delay unit 13 is held. Thus, it is possible to prevent the deterioration in the control performance of the positioning control apparatus due to a disturbance position error component asynchronous with the rotation of the optical disk 1 which Is caused after holding the inner state.

The mode switching unit includes means for on/off operation of inputting the position error signal Xe to the first adder 10. The means for on/off operation comprises the first switch 24 and the mode switch 25.

Next, a description is given of the operation according to the fifth embodiment of the present invention. Incidentally, for the brief description, the transfer characteristics of the position detector (route from the amount of movement Xo of the moving member to the error signal Xe) and the transfer characteristics of the drive unit 26 are represented by approximate normalization with 1, respectively.

The transfer characteristics P of the moving member according to the fifth embodiment can be approximated by a secondary delay system expressed by the following formula.

$$P(s)=348/(s^2+21.9s+1.14\times10^5) \text{ (unit: m/A)} \tag{B5}$$

According to the fifth embodiment, transfer characteristics C(s) of the compensating unit 18 are set by the following formula (B6). Thus, transfer characteristics G(s) of the basic control unit are expressed by the following formula (B7). Accordingly, the cut-off frequency of the basic control unit can be obtained near 2 kHz.

$$C(s) = 2\times10^6 \times \{(s+1,741)/(s+326)\} \times \{(s+3,141)/(s+50,265)\} \tag{B6}$$

$$G(s) = C(s)P(s) \tag{B7}$$

In the basic control unit according to the fifth embodiment, the phase indicates delay characteristics of approximately −180° at the cut-off frequency of the basic control unit. Therefore, the compression performance of the position error signal is not obtained at the frequency of approximately 2 kHz or more.

By setting the transfer characteristics F(s) of the second filter 14 by the following formula (B8), the transfer characteristics F(s) have almost inverse characteristics of the basic control unit, near the cut-off frequency of the basic control unit according to the fifth embodiment and within a part of the frequency band higher than the cut-off frequency.

$$F(s)=G(s)-1\times\{3.14\times105/(s+3.14\times105)\}2 \tag{B8}$$

In the formula (B8), inverse characteristics P(s)−1 of the moving member included in G(s)−1 may use approximate characteristics of the moving member which has previously been obtained experimentally.

The mode switch 25 according to the fifth embodiment selects, as the frequency characteristics of the first filter 12, any of characteristics of two low-pass filters expressed by the following formulae (B9) and (B10). Further, the mode switch 25 outputs the band switch signal 105 indicating the selection result, The first filter 12 switches the frequency characteristics to any of the frequency characteristics (B9) and (B10) in accordance with the band switch signal 105.

$$Fi(s) = 3.77\times10^4/(s+3.77\times10^4) \tag{B9}$$

$$Fi(s) = 3.77\times10^3/(s+3.77\times10^3) \tag{B10}$$

A limiting band of the formula (B9) is set to 6 kHz higher than 2 kHz as the cut-off frequency of the basic control unit. A limiting band of the formula (B10) is set to 600 Hz lower than 2 kHz as the cut-off frequency of the basic control unit.

The mode switch 25 controls the switching operation of the first switch 24, the second switch 23, the third switch 22, the fourth switch 21, and the fifth switch 20 in accordance with the operating state of the positioning control apparatus (focus control apparatus) as shown in Table 1.

TABLE 1

Control for switching control mode by mode switch

| State | 1st switch 24 | 2nd switch 23 | 3rd switch 22 | 4th switch 21 | 5th switch 20 |
|---|---|---|---|---|---|
| State a | OFF | Select signal 102 | OFF | OFF | OFF |
| State b | ON | Select signal 102 | OFF | OFF | OFF |
| State c | ON | Select signal 102 | ON | ON | OFF |
| State d | ON | Select signal 102 | ON | ON | ON |
| State e | OFF | Select signal XL | ON | ON | OFF |
| State f | OFF | Select signal XL | ON | ON | ON |
| State g | OFF | Select signal XL | ON | OFF | OFF |

Hereinbelow, each state in Table 1 will be described. The mode switch 25 selects a state a in Table 1. Then, a servo loop is formed without adding and inputting the delay signal XL of the signal delay unit 13 and an output signal of the second filter 14 to the compensating unit 18. In the state a, inner states of the signal delay unit 13 and the second filter 14 are cleared to zero.

The mode switch 25 selects a state b in Table 1. Then, servo loop is formed without adding and inputting the delay signal XL of the signal delay unit 13 and an output signal of the second filter 14 to the compensating unit 18. In the state b, inner states of the signal delay unit 13 and the second filter 14 are updated without adding and accumulating the position error in the signal delay unit 13.

The mode switch 25 selects a state c in Table 1. Then, a servo loop is formed, in which the delay signal XL of the signal delay unit 13 is added and inputted to the compensating unit 18 and the output signal of the second filter 14 is not added and inputted. The mode switch 25 selects a state d in Table 1 and, then, a servo loop is formed, in which the delay signal XL of the signal delay unit 13 and the output signal of the second filter 14 are added and inputted to the compensating unit 18.

The mode switch 25 selects a state e in Table 1. Then, accumulated position error information of the delay element 16 in the signal delay unit 13 is held. In the state e, a servo loop is formed, in which the delay signal XL of the signal delay unit 13 is added and inputted to the compensating unit 18. The mode switch 25 selects a state f in Table 1 and, then, the accumulated position error information of the delay element 16 in the signal delay unit 13 is held. In the state f, a servo loop is formed, in which the delay signal XL of the signal delay unit 13 and the output signal of the second filter 14 are added and inputted to the compensating unit 18.

The mode switch 25 selects a state g in Table 1 and, then, the accumulated position error information of the delay element 16 in the signal delay unit 13 is held. In the state 9, a servo loop is formed without adding and inputting the delay signal of the signal delay unit 13 and the output signal of the second filter 14 to the compensating unit 18.

When the mode switch 25 selects the state d, the positioning control apparatus according to the fifth embodiment has the structure of the positioning control apparatus according to the second conventional art. By setting the formulae (B5) to (B9), a converging condition of the position error signal Xe expressed by the following formula (B11) is satisfied in the second conventional art.

$$|1+G(s)|>|1-G(s)F(s)|\times|Fi(s)| \quad (B11)$$

In the formula (B11), |1+G(s)|, |1−G(s)F(s)|, and |Fi(s)| are gains of 1+G(s), 1−G(s)F(s), and Fi(s), respectively. As mentioned above, in the state d in Table 1, it is advantageous to compress the position error component which is synchronous with the rotation of the optical disk 1 over the cut-off frequency (2 kHz) of the basic control unit.

When the mode switch 25 selects the state c, the positioning control apparatus according to the fifth embodiment has the structure of the positioning control apparatus according to the first conventional art. By setting the formulae (B5) to (B9), a converging condition of the position error signal Xe expressed by the following formula (B12) is satisfied in the first conventional art.

$$|1+G(s)|>|Fi(s)| \quad (B12)$$

In the state c in Table 1, it is not possible to obtain the advantage for compressing the position error component which is synchronous with the rotation of the optical disk 1 over the cut-off frequency (2 kHz) of the basic control unit. However, it is possible to obtain the advantage for compressing the position error component which is synchronous with the rotation of the optical disk 1 within the frequency range of the approximate cut-off frequency or less of the formula (B10).

According to the fifth embodiment, when the mode switch 25 selects the state c and the formulae (B5) to (B9) are set, a converging condition of the position error signal Xe represented by the formula (B12) is not satisfied. Therefore, the position error signal Xe is gradually dispersed every accumulation of the position errors in the signal delay unit 13.

Next, a description is given of the relationship between the states a to g in Table 1 and the operating state of the positioning control apparatus according to the fifth embodiment. Before closing the focus servo loop, the mode switch 25 selects the state a and selects the formula (B9) as the frequency characteristics of the first filter 12. When a predetermined time T0 passes and the focus servo is settled after closing the focus servo loop, the mode switch 25 switches the control mode to the state d.

After settling the focus servo, the delay signal XL of the signal delay unit 13 and the output signal of the second filter 14 are added and inputted to the compensating unit 18. Therefore, a positioning servo system can be implemented without deteriorating the position error signal Xe and without adding and accumulating a transient response of the position error signal Xe, which is caused by pulling in the focus servo, in the signal delay unit 13.

The predetermined time T0 is obtained experimentally and set so that R is necessary and sufficient to settle the focus servo. Preferably, the predetermined time T0 is set to a time constant or more of the closed-loop characteristics of the basic control unit.

After the mode switch 25 selects the state d, a predetermined time T1 passes and the position error signal Xe added and accumulated in the signal delay unit 13 is settled. Then, the mode switch 25 may select the state f. The position error signal Xe added and accumulated in the delay element 16 upon selecting the state f is circulated in the delay element 16 at the period of the time L and is held. Even if the disturbance signal asynchronous with the rotation of the optical disk 1 is multiplexed to the position error signal Xe, it is possible to prevent the deterioration in position error signal Xe caused by the asynchronous disturbance signal without adding and accumulating the asynchronous disturbance signal in the delay element 16.

The predetermined time T1 is obtained experimentally and set so that it is necessary and sufficient to settle the position error signal Xe added and accumulated in the signal delay unit 13. Preferably, the predetermined time T1 is set to a time of the one-rotation period or more of the optical disk 1 so that the signal in the delay element 16 is updated at least once.

The mode switch 25 selects the state d after closing the focus servo loop. Further, the mode switch 25 opens the servo loop and selects the state g when the focus servo loop is opened after the predetermined time T1 passes. The accumulated position error signal in the delay element 16 is circulated in the delay element 16 at the period of the time L and Is held.

When the mode switch 25 selects the state d after closing the focus servo loop and it opens the focus servo loop after the predetermined time T1 passes, the mode switch 25 selects the state 9 simultaneously to the opening of the focus servo loop. The position error signal Xe accumulated in the delay element 16 is circulated and held in the delay element 16 at the period of the time L.

When the state g is selected, then, the focus servo loop is closed again, and the state d is selected, the signal in the delay element 16 is added and accumulated. Therefore, after starting to add and input the delay signal XL of the signal delay unit 13 and the output signal of the second filter 14 to the compensating unit 18, a predetermined time until the position error signal is settled can be reduced.

When the focus servo loop is opened before the predetermined time T1 passes or when it is considered that the repetitiveness of the position error signal Xe after turning on the focus servo again is different from the repetitiveness upon previously turning on the focus servo again because the optical disk 1 is replaced upon opening the focus servo loop or the position of the laser beam spot 3 in the radius direction of the optical disk 1 is changed, preferably, the mode switch 25 selects the state a again when the focus servo loop is opened.

When the mode switch 25 selects the state d, the position error signal Xe is compressed over the cut-off frequency of the basic control unit. In other words, according to the fifth embodiment, the focus actuator 55 is driven with the frequency over 2 kHz, and a drive current of the focus actuator 5 is increased. The increase in drive current is permitted upon recording and reading the information to the optical disk 1, that is, when the compression performance of the position error signal Xe is obtained most.

However, in a standby mode for waiting an instruction to execute the operation for recording and reading the information from an upper control unit (not shown) without performing the operation for recording and reading the information, the compression performance of the position error signal Xe is not so requested as compared with the time for recording and reading the information. Therefore, preferably, the drive current is reduced in view of the reduction in power consumption of the optical disk apparatus and the reduction in load to the focus actuator 5. Then, the mode switch 25 selects the state b or c in the standby mode.

Upon selecting the state b, the servo loop is formed without adding and inputting the delay signal XL of the signal delay unit 13 and the output signal of the second filter 14. Therefore, although the remaining error over the cut-off frequency of the basic control unit cannot be obtained, the drive current of the focus actuator 5 is not increased, either. The inner states of the signal delay unit 13 and the second filter 14 are updated without accumulating the position error signal Xe in the signal delay unit 13. Thus, it is possible to reduce an settling time for accumulating the position error signal Xe In the signal delay unit 13, by the time L in the delay element 16 which Is required for shift from the state a to the state d, upon shifting to the state d again. It is possible to quickly shift from the standby mode to the state for recording and reading the information.

Upon selecting the state c, the mode switch 25 outputs the band switch signal 105 for selecting the formula (B10) as the frequency characteristics of the first filter 12, and controls the switching operation of the frequency characteristics of the signal delay unit 13. Because the converging condition of the position error in the formula (B12) is satisfied upon selecting the state c.

Upon selecting the state c, the position control apparatus according to the fifth embodiment has the structure of the positioning control apparatus according to the first conventional art. Therefore, the remaining position error is not obtained over the cut-off frequency in the basic control unit. However, the position error signal component not more than the cut-off frequency of the basic control unit is compressed even upon standby mode, as compared with the selection of the state b. The state is quickly shifted to the state d again. In the state c, the position tracking control is limited on the low-frequency side having a high current-shift-sensitivity of the focus actuator 5. Therefore, the increase in drive current of the focus actuator 5 can be suppressed as compared with the selection of the state d.

According to the fifth embodiment, upon switching the state c to another state, the mode switch 25 controls the operation for switching the cut-off frequency of the first filter 12 to the formula (B9).

After selecting the state c, a predetermined time T2 passes and the addition and accumulation of the position error in the signal delay unit 13 is settled. Then, the mode switch 25 may control the switching operation to the state e. In the state c, similarly to the state d, when the position error signal Xe asynchronous with the rotation of the optical disk 1 is accumulated in the signal delay unit 13, the output of the signal delay unit 13 does not necessarily compress the position error after the time L.

By controlling the operation for switching the state to the state e, the position error signal Xe added and accumulated in the delay element 16 is circulated and held in the delay element 16 at the period of the time L. Consequently, even if the disturbance signal asynchronous with the rotation of the optical disk 1 is multiplexed to the position error signal Xe after selecting the state e, the deterioration in position error signal due to the asynchronous disturbance signal can be prevented without accumulating the asynchronous disturbance signal in the delay element 16.

Sixth Embodiment

Figure 10:
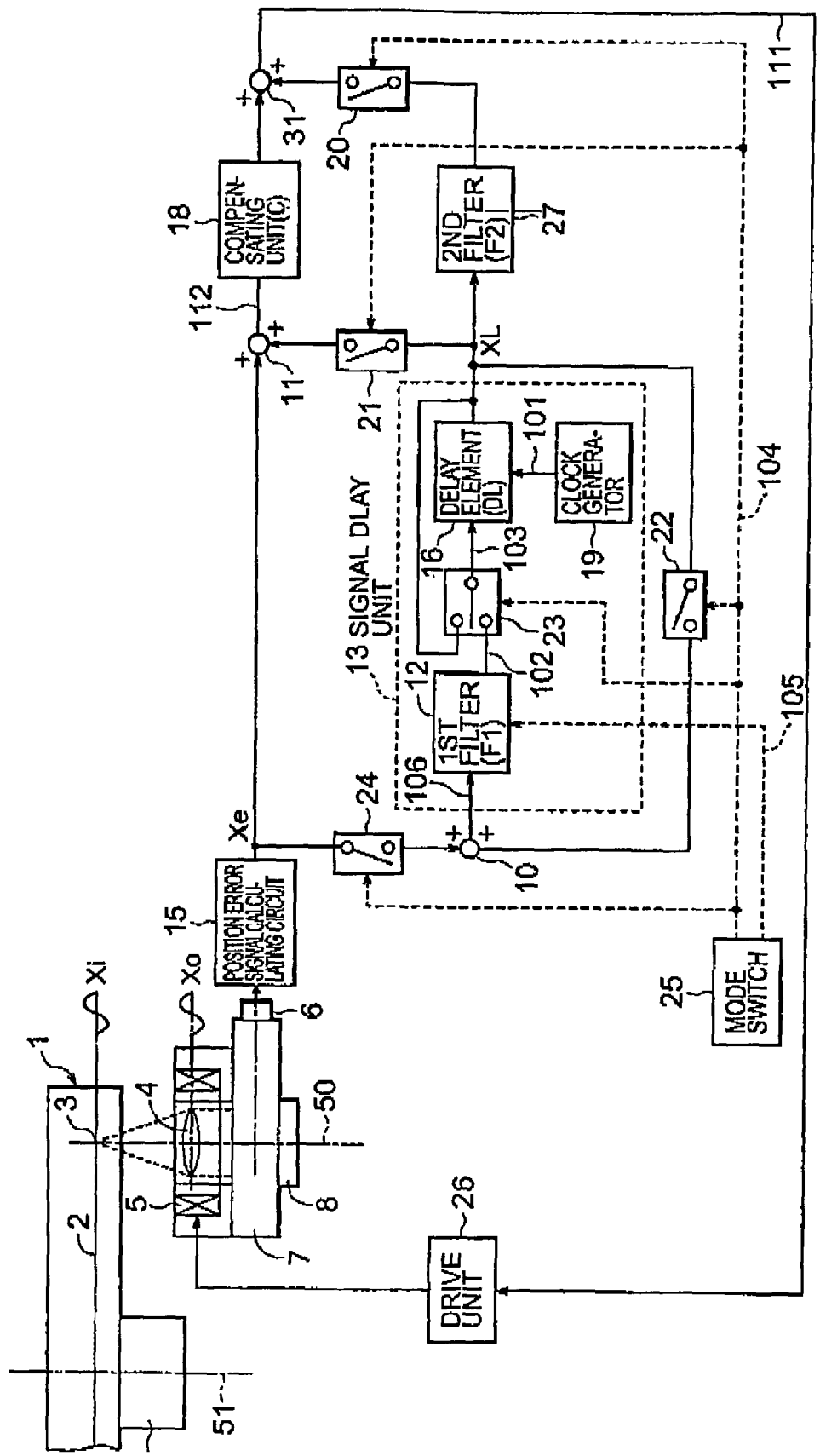
FIG. 10 is a block diagram showing the structure of a positioning control apparatus in an optical disk apparatus according to a sixth embodiment of the present invention.

FIG. 10 is a block diagram showing the structure of a positioning control apparatus in an optical disk apparatus according to the sixth embodiment of the present invention. The same reference numerals in FIG. 10 as those in FIG. 8 denote the same components. According to the fifth embodiment, the output of the second filter 14 is added to the input side of the compensating unit 18 via the fifth switch 20.

On the other hand, according to the sixth embodiment, in place of the second filter 14, the positioning control apparatus comprises a third filter 27. Transfer characteristics F(s) of the third filter 27 are set by the following formula (B13). In place of the third adder 17, the positioning control apparatus comprises a fourth adder 31.

$$F(s)=P(s)^{-1}\times\{3.14\times10^5/(s+3.14\times10^5)\}^2 \quad (B13)$$

The output signal of the compensating unit 18 and the output signal from the third filter 27 via the fifth switch 20 are added by using the fourth adder 31. As a feature of the sixth embodiment, an output of the fourth adder 31 is inputted to the drive unit 26 as the drive control signal 111.

The filter based on the formula (B13) has inverse characteristics of the moving member near the cut-off frequency of the basic control unit and within a part of a frequency band higher than the cut-off frequency. Therefore, if the focus actuator 5 is driven by the delay signal XL via the third filter 27, the amount of movement of the moving member is equal to the amount of position shift indicated by the delay signal XL near the cut-off frequency signal of the basic control unit and within a part of the frequency band higher than the cut-off frequency. As mentioned above, according to the sixth embodiment, it will obviously be understood to obtain the same advantage for compressing the position error as that according to the fifth embodiment. The mode switch 25 may control the switching operation similarly to that according to the fifth embodiment.

According to the fifth and sixth embodiments, the positioning control apparatus comprises the analog control system as an example. However, advantageously, the positioning control apparatus comprises a digital control system. For example, a description is added with reference to FIG. 8 according to the fifth embodiment. When the positioning control apparatus in FIG. 8 comprises the digital control system, the position error calculating circuit 15 includes an A/D (Analog to Digital) converter and data of the position error Xe signal after A/D conversion is outputted as the position error signal Xe.

Each of the first filter 12, the second filter 14, and the compensating unit 18 comprises a digital filter synchronous with a sampling clock which is outputted by a sampling clock generating circuit (not shown). A synthesizer (not shown) switches the sampling clock which is supplied to the first filter 12 and, thereby, the switching operation of the cut-off frequency of the first filter 12 is implemented. The delay element 16 comprises a shift register which is operated by the clock signal 101. The compensating unit 18 includes a D/A (Digital to Analog) converter. The compensating unit 18 D/A converts a signal which Is subjected to calculation for compensation. Then, the drive unit 26 amplifies power of the converted signal and, thereafter, the amplified signal may be applied and inputted to the focus actuator 5.

Advantageously, the positioning control apparatus according to the fifth and sixth embodiments comprises a highbred control system mixedly including the analog control system and the digital control system. When only the delay element 16 in the signal delay unit 13 comprises the digital control system, an A/D converter (not shown) converts the signal 103 into digital data and the converted digital data is inputted to the delay element 16. The delay element 16 comprises a shift register for shifting input data to the outside in accordance with the clock signal 101. A D/A converter (not shown) may convert output data of the delay element 16 to an analog signal and may output the converted signal as the delay signal XL.

According to the fifth and sixth embodiments, for the simple description, the axial tracking apparatus (focus position control apparatus) in the optical disk apparatus is an example of the positioning control apparatus. However, the positioning control apparatus can be applied to another apparatus having the same feature and the present invention is not limited to the above embodiments.

Seventh Embodiment

According to the first to sixth embodiments, it is defined that the moving member comprises the objective lens and the focus actuator, which move the laser beam spot. Further, it is defined that the position detector comprises the optical detector, the optical head, the laser source, and the position error signal calculating circuit. Thus, according to the first to sixth embodiments, the basic control unit comprises the moving member, the position detector, the compensating unit, and the drive unit, which are serially combined.

A positioning control apparatus and a positioning control method are described according to a seventh embodiment of the present invention.

Figure 11:
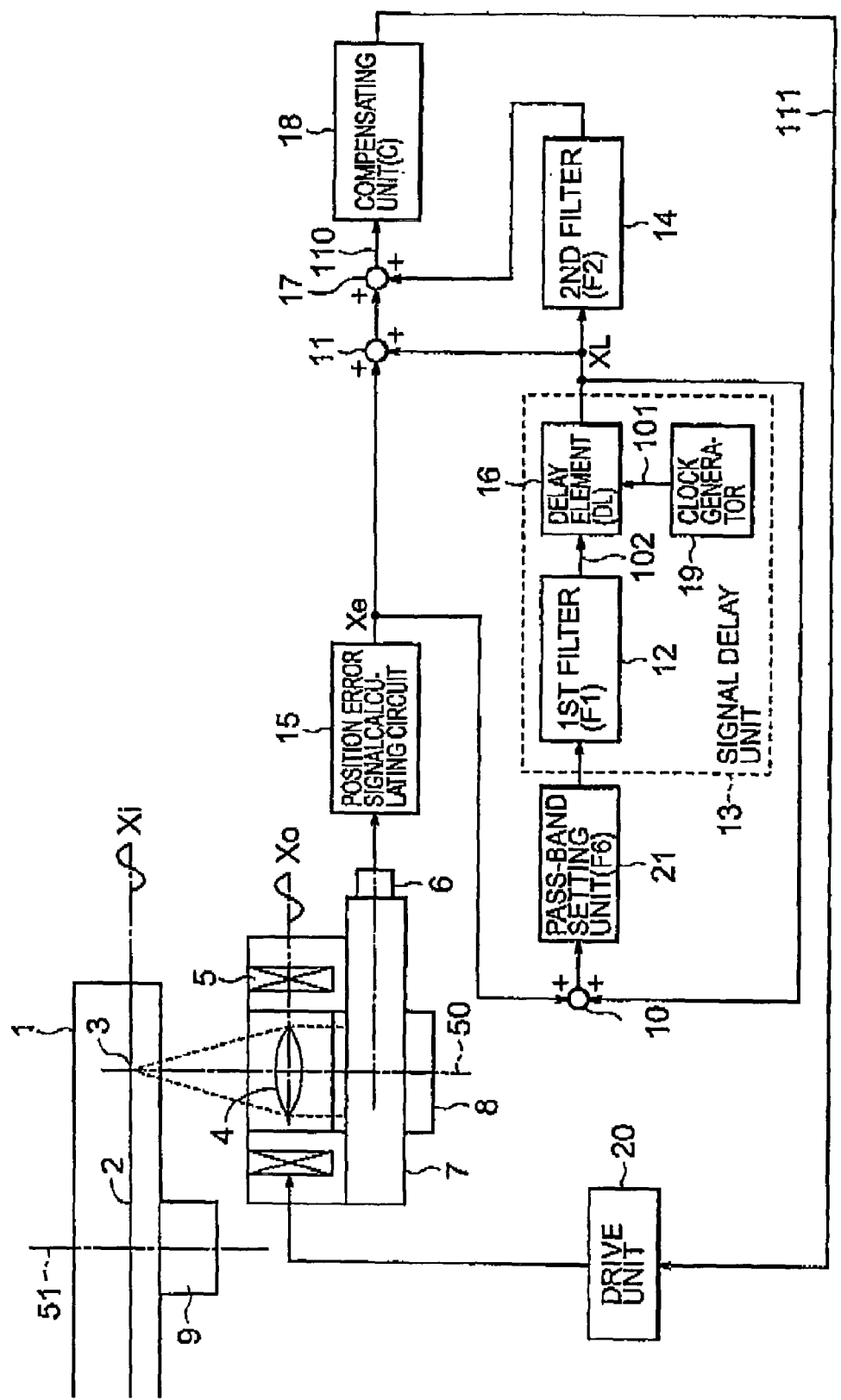
FIG. 11 is a block diagram showing the structure of an axial tracking (focus position control) apparatus in an optical disk apparatus to which a positioning control apparatus is applied according to a seventh embodiment of the present invention.

FIG. 11 is a diagram showing the structure of an axial tracking (focus position control) apparatus in an optical disk apparatus to which the positioning control apparatus according to the seventh embodiment is applied. The axial tracking apparatus comprises the objective lens 4, the focus actuator 5, the optical detector 6, the optical head 7, the laser source 8, the first adding circuit 10, the second adding circuit 11, the signal delay unit 13, the second filter 14, the position error signal calculating circuit 15, the third adding circuit 17, the compensating unit 18, the drive unit 20, and the pass-band setting unit 21.

A laser beam spot (focus position) 3 is formed via the objective lens 4 by converging the laser beam outputted from the laser source 8. The focus actuator 5 shifts the objective lens 4 along the optical axis 50 of the laser beam based on an output signal of the drive unit 20, thereby displacing the laser beam spot 3 (by the amount of movement Xo of the moving member). The optical detector 6 converts a reflected light signal from the optical disk 1, which is detected via the objective lens 4 and the optical head 7, into an electric signal. The laser source 8 outputs the laser beam which is irradiated to the optical disk 1. The first adding circuit 10 adds the position error signal Xe and the delay signal XL outputted by the signal delay unit 13, and outputs the addition result to the pass-band setting unit 21. The second adding circuit 11 adds the position error signal Xe and the delay signal XL, and outputs the addition result. The signal delay unit 13 delays an output signal of the pass-band setting unit 21.

The second filter 14 subjects the delay signal XL to predetermined filtering processing and outputs the processing signal. Characteristics of the second filter 14 can be implemented without differentiation by serially combining a filter having inverse characteristics of the basic control unit and a low-pass filter having a degree equal to a relative degree of pole-zero in the basic control unit and the cut-off frequency wider than a cut-off frequency of the basic control unit.

The position error signal calculating circuit 15 extracts and outputs a focus error signal from the output signal of the optical detector 6. The focus error signal is designated by the position error signal Xe and may be generally detected by a knife edge method, an astigmatic method, etc. The third adding circuit 17 adds an output of the second adding circuit 11 and an output of the second filter 14, and outputs the addition signal.

The compensating unit 18 outputs the drive control signal 111 of the focus actuator 5 based on an output of the third adding circuit 17. The compensating unit 18 may be any unit for obtaining desired compensation characteristics for stabilization or compensation characteristics for offset. The compensating unit 18 according to the seventh embodiment comprises an amplifier (gain) and a phase compensating filter obtained by serially combining a lead-lag filter comprising an analog element and a lag-lead filter comprising an analog element. The lead-lag filter implements the compensation for stabilization near the cut-off frequency of the basic control unit. The lag-lead filter implements the compensation for offset near a resonant frequency of the focus actuator 5.

The drive unit 20 outputs a signal obtained by amplifying power of the drive control signal 111 to the focus actuator 5, and drives the focus actuator S in accordance with the drive control signal 111. The drive unit 20 may be any unit which can freely drive the focus actuator 5. Incidentally, the drive unit 20 according to the seventh embodiment comprises a power amplifier for setting the drive control signal 111 to a reference signal for a drive current of the focus actuator 5.

The pass-band setting unit 21 subjects the output signal of the first adding circuit 10 to pass-band filtering processing and outputs the processing signal.

The signal delay unit 13 comprises the first filter 12, the delay element 16, and the clock generator 19. The first filter 12 subjects the output signal of the pass-band setting unit 21 to band limiting processing, and outputs the processing signal as the signal 102.

The delay element 16 outputs the delay signal XL which is obtained by delaying the signal 102 by the time L almost equal to the period of the one rotation of the optical disk 1. The delay element 16 may be any means for obtaining predetermined signal delay. The clock generator 19 outputs the clock signal 101.

According to the sixth embodiment, when the positioning control apparatus comprises, for example, an analog controller, simply, the delay element 16 using a CCD (Charge Coupled Device) is used. The CCD shifts the signal 102 inputted from the delay element 16 to the outside in accordance with the clock signal 101, and is like a shift register of an analog signal. The CCD can delay the signal corresponding to a period of the clock signal 101.

The delay signal XL is obtained by weighting and adding the position error signals Xe of the optical disk 1 up to the rotation before one rotation in a pass band of the pass-band setting unit 21, within the limiting band of the first filter 12. Therefore, the delay signal XL is increased every rotation of the optical disk 1 and is added and accumulated in the delay element 16 until the position error within the limiting band of the first filter 12 weighted by the pass-band setting unit 21 is zero.

According to the seventh embodiment, the axial tracking apparatus in the optical disk apparatus comprises a positioning control apparatus for tracing the laser beam spot 3 to the information recording position 2 on the optical disk 1. More specifically, the target member is the information recording position 2 (similarly to the first to sixth embodiments).

The spindle motor 9 rotates the optical disk 1 around the rotational axis 51 of the spindle motor 9 at almost a predetermined period. The spindle motor 9 is controlled by a controller (not shown). The information recording position 2 repeatedly shifts the position thereof (by shift X1 of the target position) in the optical axis 50 of the laser beams almost equally at a predetermined period.

A description is given of the optical disk apparatus with the above structure according to the seventh embodiment. Incidentally, transfer characteristics of the position detector (corresponding to a signal route from the amount of movement of the moving member Xo to the position error signal Xe) and transfer characteristics of the drive unit 20 are approximately normalized by 1.

Transfer characteristics P of the moving member can be approximated by a secondary phase delay system expressed by the following formula (C4), according to the seventh embodiment.

$$P(s)=348/(s^2+21.9s+1.14\times10^5) \text{ (unit: } m/A\text{)} \quad (C4)$$

The transfer characteristics P(s) of the compensating unit 18 are set by the following formula (C5) according to the seventh embodiment. Therefore, transfer characteristics G(s) of the basic control unit are expressed by the following formula (C6). The cut-off frequency of the basic control unit can be obtained near a frequency of 2 kHz. Further, according to the seventh embodiment, the basic control unit has delay characteristics with a phase of approximately −180° of the cut-off frequency in the basic control unit. Thus, compression performance of the position error signal cannot be obtained by a frequency of 2 kHz or more.

Transfer characteristics F(s) of the second filter 14 are expressed by the following formula (C7). Thereby, the transfer characteristics F(s) have characteristics almost equal to inverse characteristics of the basic control unit, near the cut-off frequency of the basic control unit and within a part of a frequency band higher than the cut-off frequency according to the seventh embodiment. In the following formula (C7), Inverse characteristics P(s)−1 of the moving member included in G(s)−1 may use approximate characteristics of the moving member which is previously obtained experimentally.

$$C(s) = 2\times10^6 \times \{(s+1{,}741)/(s+326)\} \times \{(s+3{,}141)/(s+50{,}265)\} \quad (C5)$$

$$G(s) = C(s)P(s) \quad (C6)$$

$$F(s) = G(s)^{-1} \times \{3.14\times10^5/(s+3.14\times10^5)\}^2 \quad (C7)$$

A limiting band in the transfer characteristics of the first filter 12 is set to a frequency of 6 kHz which is higher than the cut-off frequency of 2 kHz of the basic control unit according to the seventh embodiment and the following formula (C8) is obtained.

$$Fi(s)=3.77\times10^4/(s+3.77\times10^4) \quad (C8)$$

Transfer characteristics DL(s) of the delay element 16 are represented by the following formula (9).

$$DL(s)=e^{-Ls} \quad (C9)$$

The pass band of the pass-band setting unit 21 is set to approximately 120 Hz to 2.5 kHz, near 550 Hz as center lower than the cut-off frequency of basic limiting means (2 kHz in the seventh embodiment). Thus, a transfer function Fb(s) of the pass-band setting unit 21 represented by the following formula (C10) is obtained. Incidentally, in the formula (C10), maximum 12 dB is weighted within the pass band.

$$Fb(s)=\{(s+3.77\times10^2/(s+7.54\times10^2)\}^2 \times \{(s+3.14\times10^4)/(s+1.57\times10^4)^2/2^2 \quad (C10)$$

Referring to the second conventional art, the converging condition of the position error in the present invention is represented by the following formula (C11). Incidentally, reference symbol |X| denotes a gain of X.

$$|1+G(s)|>|1-G(s)F(s)|\cdot|Fi(s)|\cdot|Fb(s)| \quad (C11)$$

Differently from the converging condition (A6) of (|1+G(s)|>|1−G(s)F(s)|·|Fi(s)|) as the converging condition of the position error according to the second conventional art, the gain |Fb(s)| of the pass-band setting unit 21 is multiplied to a right side of the converging condition expressed by the formula (C11).

That is, as expressed by the formula (C10), as long as the gain of the pass-band setting unit 21 is 1 or less, the converging condition of the position error expressed by the formula (C11) is included in the converging condition of the position error according to the second conventional art.

By setting the formulae (C4) to (C8) as mentioned above, the converging condition of the formula (C11) is satisfied. Consequently, it is possible to compress the position error component synchronous with the rotation of the optical disk 1 over the cut-off frequency of the basic control unit.

Similarly, when designating compression performance of the position error (transfer characteristics from the position shift Xi to the position error signal Xe of the target member) by Gc(s) in the axial tracking apparatus according to the seventh embodiment, the transfer characteristics GC(s) is expressed by the following formula (C12).

$$Gc(s)=\{1-Fb(s)Fi(s)e^{-Ls}\}/\{1-Fb(s)Fi(s)e^{-Ls}+G(s)+G(s)F(s)Fb(s)Fi(s)e^{-Ls}\} \quad (C12)$$

When compression characteristics of the position error component including a harmonic component synchronous with the rotation of the optical disk 1 are designated by Gc3(s), the compression characteristics Gc3(s) corresponds to the case of (e−Ls=1) in the formula (C12) and is expressed by the following formula (C13).

$$Gc3(s)=\{1-Fb(s)Fi(s)\}/\{1-Fb(s)Fi(s)+G(s)+G(s)F(s)Fb(s)Fi(s)\} \quad (C13)$$

When compression characteristics of the position error component at the intermediate period of the signal-delay amount L are designated by Gc4(s), the compression characteristics Gc4(s) corresponds to the case of (e−Ls=−1) in the formula (C12) and is expressed by the following formula (C14).

$$Gc4(s)=\{1+Fb(s)Fi(s)\}/\{1+Fb(s)Fi(s)+G(s)-G(s)F(s)Fb(s)Fi(s)\} \quad (C14)$$

Figure 12:
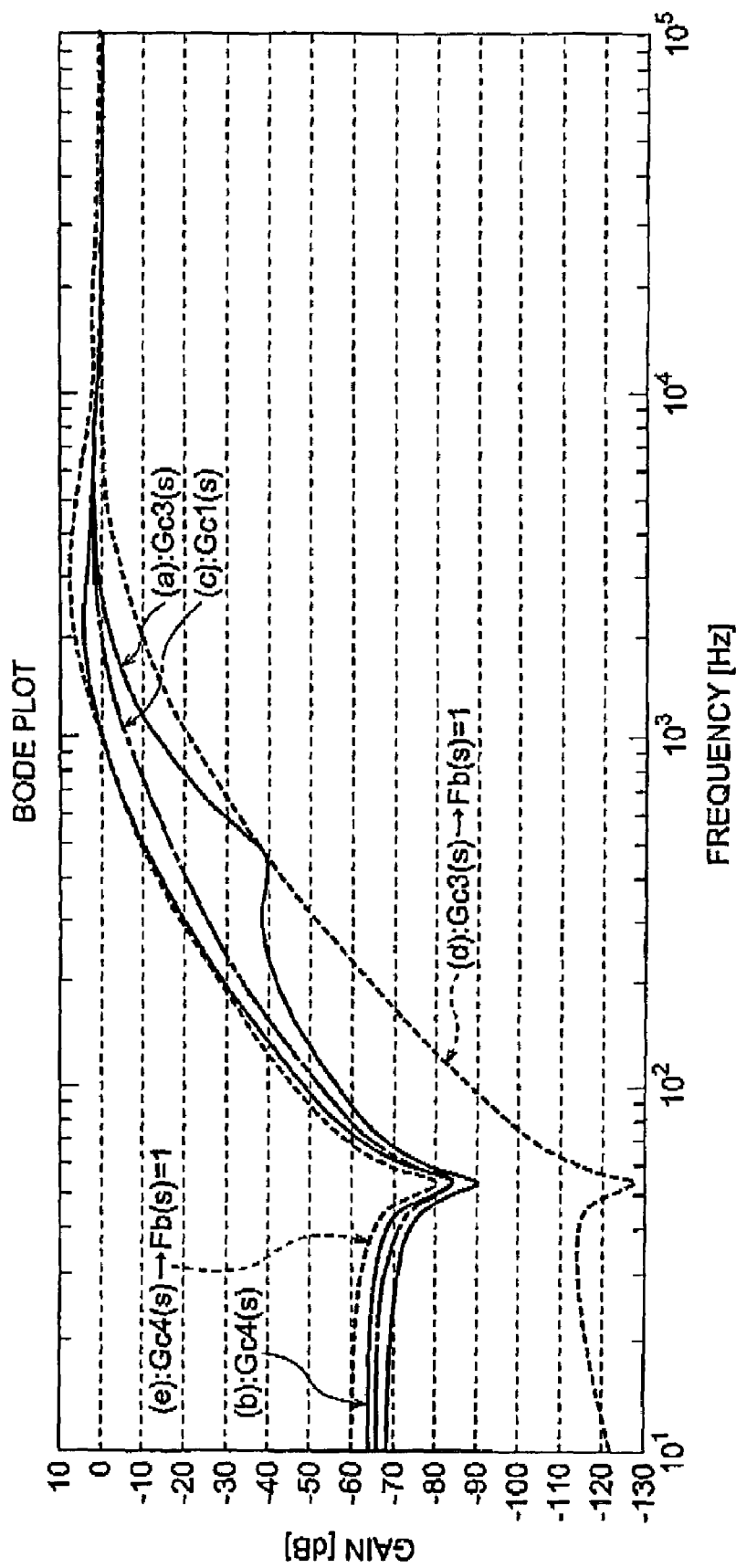
FIG. 12 is a diagram showing frequency characteristics for explaining the operation of the positioning control apparatus according to the seventh embodiment.

According to the seventh embodiment, gain characteristics of Gc1(s), Gc3(s), and Gc(4) are shown by lines (c), (a), and (b) in FIG. 12, respectively. According to the second conventional art, gain characteristics are shown by lines (d) and (e) in FIG. 12, respectively.

By comparing the gain characteristics shown by the line (c) in FIG. 12 with those shown by the lines (d) and (e) in FIG. 12, the gain characteristics In the case of adding and accumulating no position error can be compared with those in the case of applying the second conventional art and adding and accumulating the position error.

In the case of applying the second conventional art and adding and accumulating the position error, it is confirmed that, advantageously, the position error (line (d) in FIG. 12) synchronous with the rotation of the optical disk 1 can be compressed. However, with respect to the position error (the line (e) in FIG. 12) at the intermediate period of the amount of signal delay L, it is confirmed that the amount of compression of the position error is degraded at the frequency band, in particular, on the DC side.

According to the seventh embodiment, the pass band of the pass-band setting unit 21 is set near 550 Hz, as center, which is lower than the cut-off frequency of the basic control unit. Consequently, advantageously, the position error synchronous with the rotation of the optical disk 1 is obtained at the frequency near 550 Hz (as shown by the line (a) in FIG. 12). It is confirmed that the compression ratio of the position error is degraded from 6 dB to 2 dB at the intermediate period of the amount of signal delay L at the frequency band on the DC side (as shown by the line (b) in FIG. 12).

By weighting 12 dB at the maximum level at the pass band of the pass-band setting unit 21, advantageously, the position error component synchronous with the rotation of the optical disk 1 can be obtained in the case of the frequency component except for the pass band. In particular, the advantage to compress 3 dB at the maximum level can be obtained in the case of the frequency component on the DC side (as shown by the line (a) in FIG. 12).

Eighth Embodiment

Next, a positioning control apparatus and a positioning control method will be described according to an eighth embodiment of the present invention.

According to the seventh embodiment, the pass band of the pass-band setting unit 21 is set within the limiting band in the transfer characteristics of the first filter 12. It is possible to set the pass band of the pass-band setting unit 21 to be over the limiting band of the first filter 12 as long as the converging condition of the position error expressed by the formula (C11) is satisfied. However, this setting is unpreferable in terms of practical use. Because the limiting band of the first filter 12 prescribes the upper limit of the band of the signal added and accumulated in the delay element 16 so that the position error is substantially converged.

Figure 13:
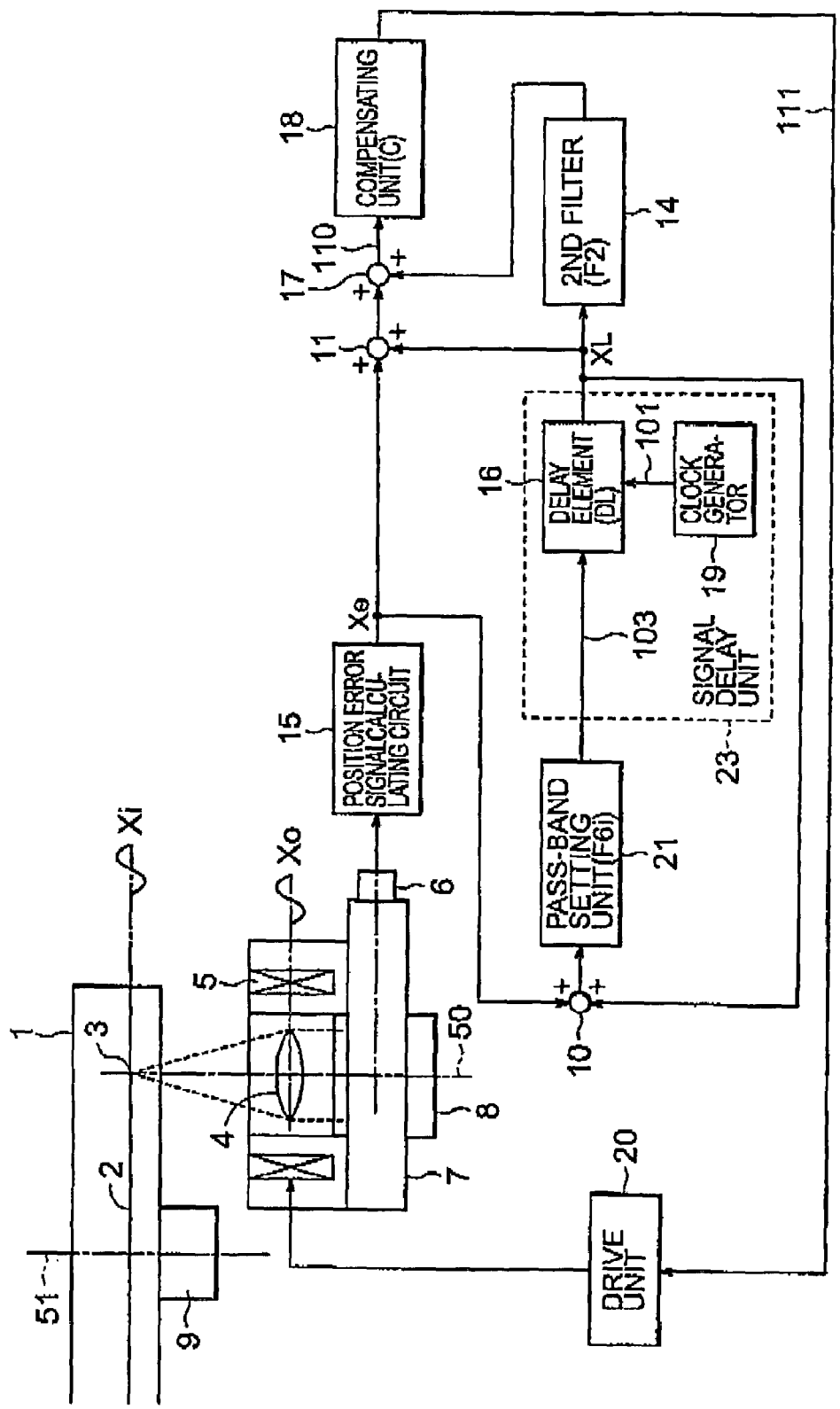
FIG. 13 is a block diagram showing the structure of an axial tracking (focus position control) apparatus in an optical disk apparatus to which a positioning control apparatus is applied according to an eighth embodiment of the present invention.

Therefore, when the upper limit of the pass band of the pass-band setting unit 21 is increased to the limiting band of the first filter 12, preferably, the structure shown in FIG. 13 according to the eighth embodiment is employed.

FIG. 13 is a block diagram showing the structure of an axial tracking (focus position control) apparatus in an optical disk apparatus to which a positioning control apparatus according to the eighth embodiment is applied.

The first adding circuit 10 adds the position error signal Xe and the delay signal XL outputted by a signal delay unit 23, and outputs the addition result to a pass-band setting unit 22. The pass-band setting unit 22 subjects the output signal of first adding circuit 10 to pass-band filtering processing and outputs the processing signal as a signal 103. Incidentally, the upper limit of the pass band of the pass-band setting unit 22 is set to be equal to the upper limit of the band of the signal added and accumulated in the delay element 16 so that the position error is substantially converged. The delay element 16 outputs the delay signal XL which is obtained by delaying the signal 103 by a time almost equally to the period of one rotation of an optical disk 1. A signal delay unit 23 comprises the delay element 16 and a clock generator 19.

A description is given of an optical disk apparatus to which the positioning control apparatus with the above structure is applied according to the eighth embodiment.

The pass band of the pass-band setting unit 22 is set to be near the cut-off frequency of basic limiting means (2 kHz in the eighth embodiment) as center. The pass-band setting unit 22 has the same limiting band as that in Fi(s) In the formula (C8). Thus, transfer characteristics Fbi(s) of the pass-band setting unit 22 expressed by the following formula (C15) are obtained according to the eighth embodiment.

$$Fbi(s)=\{s/(s+4.19\times10^3)\}\times\{3.77\times10^4)/(s+3.77\times10^4)\} \quad (C15)$$

Referring to the second conventional art, the converging condition of the position error according to the eighth embodiment is expressed by the following formula (C16).

$$|1+G(s)|>|1-G(s)F(S)|\cdot|Fbi(s)| \quad (C16)$$

By setting the converging conditions to the formulae (C4) to (C7) and (C15), ft is possible to compress the position error component synchronous with the rotation of the optical disk 1 over the cut-off frequency of the basic control unit.

According to the eighth embodiment, compression characteristics of the position error component including the harmonic component synchronous with the rotation of the optical disk 1 are designated by Gc5(s), and compression characteristics of the position error component at the intermediate period of the amount of signal delay L are designated by Gc6(s). Then, similarly to the seventh embodiment, the following formulae (C17) and (C18) are obtained.

$$Gc5(s) = \{1 - Fbi(s)\}/\{1 - Fbi(s) + G(s) + G(s)F(s)Fbi(s)\} \quad (C17)$$

$$Gc6(s) = \{1 + Fbi(s)\}/\{1 + Fbi(s) + G(s) - G(s)F(s)Fbi(s)\} \quad (C18)$$

Figure 14:
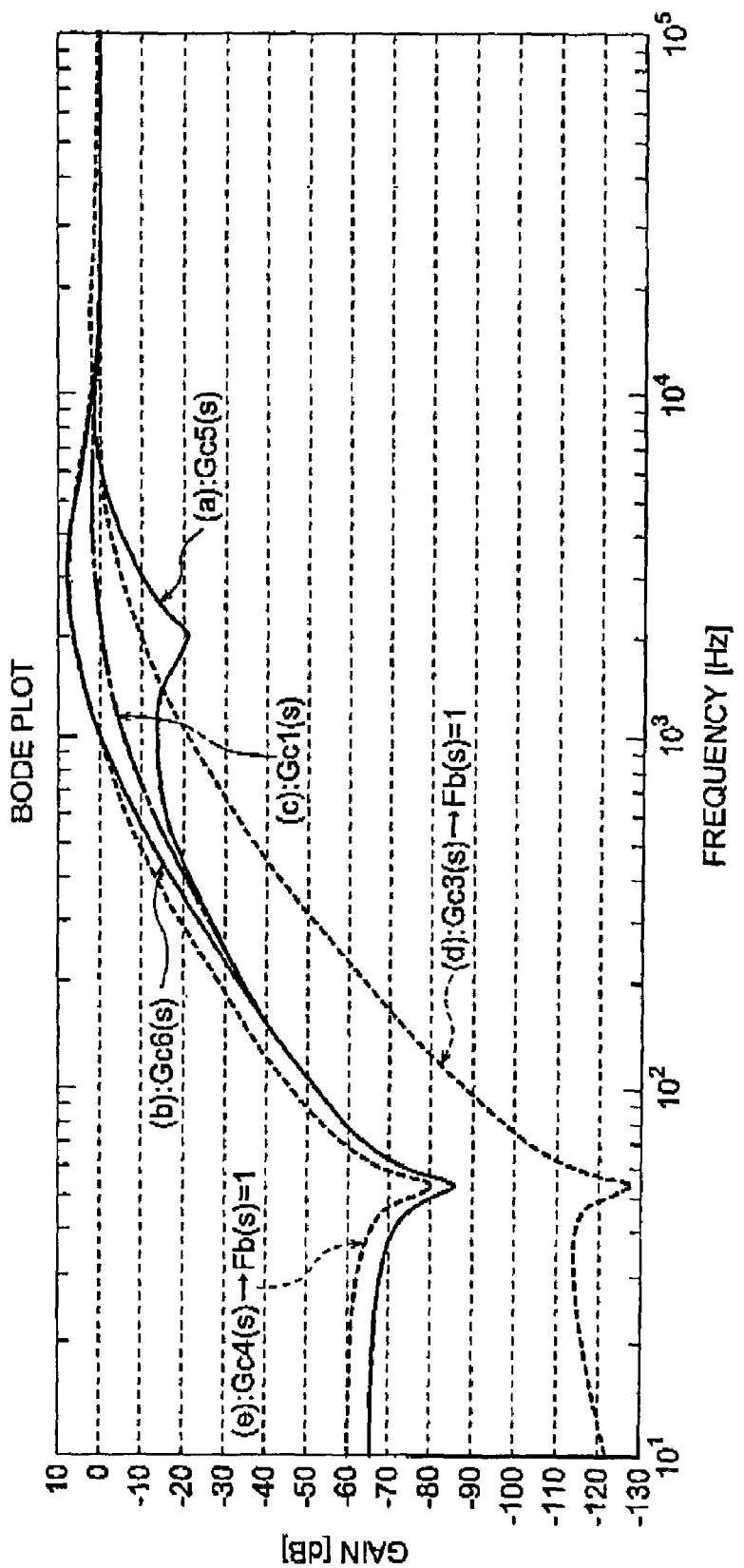
FIG. 14 is a diagram showing frequency characteristics for explaining the operation of the positioning control apparatus according to the eighth embodiment.

According to the eighth embodiment, if gain characteristics of Gc5(s) and Gc6(s) are compared with the compression characteristics Gc4(s) and Gc3(s) when Gc1(s)=1 and Fb(s)=1, lines (a) and (b) in FIG. 14 are obtained.

According to the eighth embodiment, by setting the pass band of the pass-band setting unit 22 to be approximately the cut-off frequency as center of the basic control unit, advantageously, the position error synchronous with the rotation of the optical disk 1 can be compressed (refer to the line (a) in FIG. 14). The pass-band setting unit 22 cuts off the frequency component on the DC side. Therefore, it is advantageous to suppress the degradation in position error signal at the intermediate period of the amount of signal delay at the frequency band on the DC side (refer to the line (b) in FIG. 14).

Ninth Embodiment

Next, a positioning control apparatus and a positioning control method are described according to a ninth embodiment of the present invention.

Figure 15:
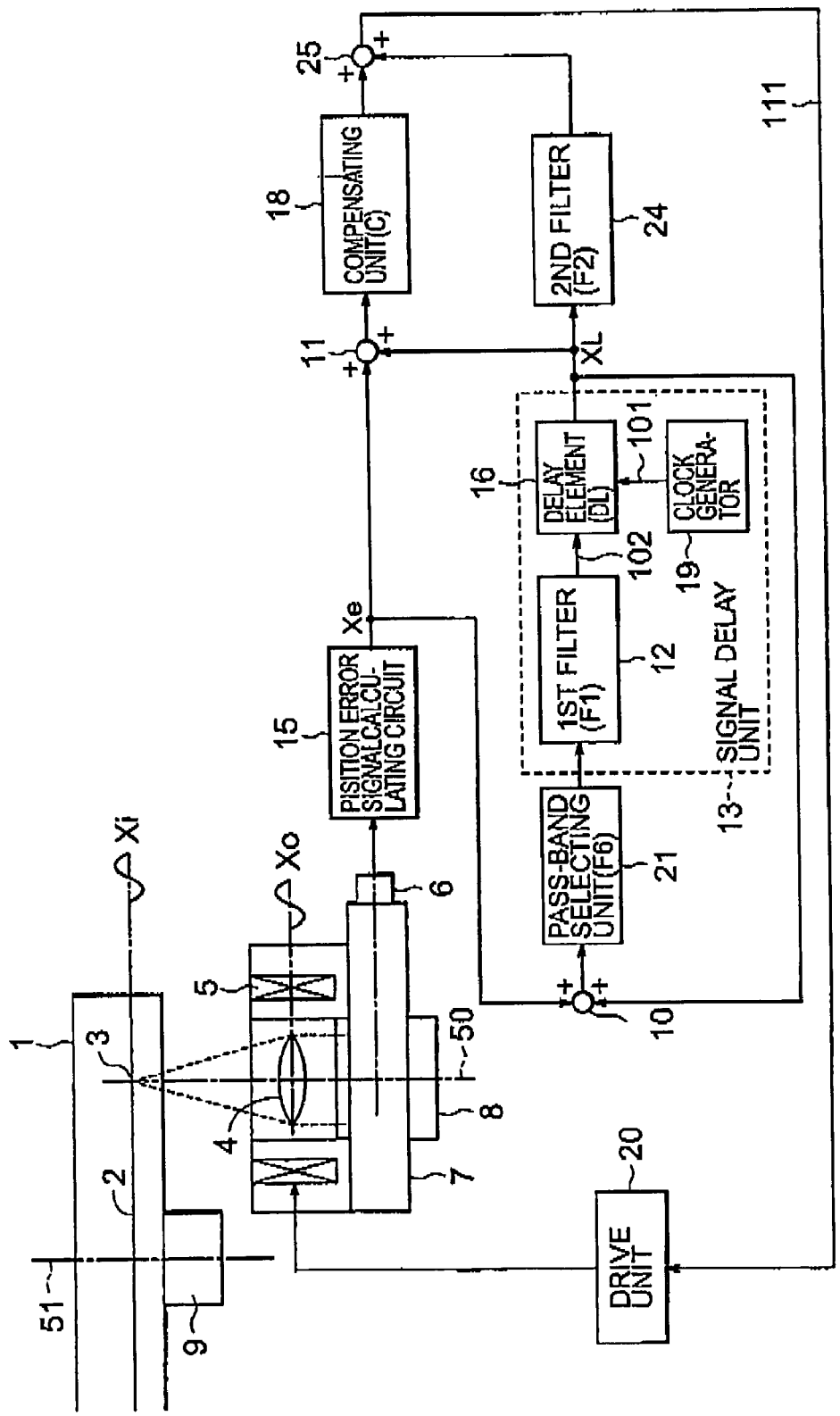
FIG. 15 is a block diagram showing the structure of an axial tracking (focus position control) apparatus in an optical disk apparatus to which a positioning control apparatus is applied according to a ninth embodiment of the present invention.

FIG. 15 is a diagram showing the structure of an axial tracking (focus position control) apparatus in an optical disk to which the positioning control apparatus according to the ninth embodiment is applied. The positioning control apparatus includes a second filter 24, in place of the second filter 14 in the positioning control apparatus according to the seventh embodiment. The second filter 24 has characteristics different from those of the second filter 14. Unlikely the second filter 14 according to the seventh embodiment, in the second filter 24, an output thereof is added to an output side of the compensating unit 18 by a fourth adder 25. Further, in the second filter 24, the output of the fourth adder 25 is inputted to the drive unit 20.

Transfer characteristics of the second filter 24 are expressed by the following formula (C19).

$$F(s)=P(s)^{-1}\times\{3.14\times10^5/(s+3.14\times10^5)\}^2 \quad (C19)$$

The second filter 24 based on the formula (C19) has inverse characteristics of the moving member near the cut-off frequency of the basic control unit and within a part of a frequency band higher than the cut-off frequency. Therefore, if the focus actuator 5 is driven by the delay signal XL via the second filter 24, the amount of movement of the moving member is equal to the amount of position shift indicated by the delay signal XL near the cut-off frequency and within a part of the frequency band higher than the cut-off frequency.

Accordingly, it will obviously be understood to obtain the same advantage for compressing the position error by the positioning control apparatus shown in FIG. 15 which is equivalent to that shown in FIG. 11.

The positioning control apparatus comprises, for example, the analog control system according to the seventh to ninth embodiments. However, advantageously, the positioning control apparatus comprises a digital control system.

For example, a description is given of the case in which the positioning control apparatus in FIG. 11 comprises the digital control system.

In the above case, the position error calculating circuit 15 includes an A/D (Analog to Digital) converter and outputs data on the position error signal after A/D conversion as the position error signal. The delay element 16 comprises a shift register which is operated by the clock signal 101. Each of the first filter 12, the second filter 14, the compensating unit 18, and the pass-band setting unit 21 comprises a digital filter synchronous with a sampling clock which is outputted by a sampling clock generating circuit (not shown). The compensating unit 18 includes a D/A (Digital to Analog) converter. The compensating unit 18 D/A converts a signal which is subjected to calculation for compensation. Then, the drive unit 20 amplifies power of the converted signal and, thereafter, the amplified signal may be applied and inputted to the focus actuator 5.

The positioning control apparatus with the above-mentioned structure in the present invention can comprise the digital control system. Incidentally, the above-mentioned structure is one example in which the positioning control apparatus In the present invention comprises the digital control system, and the present invention is not limited to the structure.

Advantageously, the positioning control apparatus comprises a highbred control system mixedly including the analog control system and the digital control system.

A description is given of an example in which the positioning control apparatus shown in FIG. 11 comprises the highbred control system.

For example, only the delay element 16 in the signal delay unit 13 comprises the digital control system. An A/D converter (not shown) converts the signal 102 into digital data and the delay element 16 comprises a shift register for shifting the signal 102 after the A/D conversion to the output side in accordance with the clock signal 101. A D/A converter (not shown) may convert output data of the delay element 16 to an analog signal and may output the converted signal as the delay signal XL.

The positioning control apparatus with the above-mentioned structure in the present invention can comprise the highbred control system. Incidentally, the above-mentioned structure is one example in which the positioning control apparatus in the present Invention comprises the highbred control system, and the present invention is not limited to the structure.

According to the first to ninth embodiments the an axial tracking (focus position control) apparatus in the optical disk apparatus is described as an example. However, the present invention is not limited to the example, and can be applied to another apparatus, such as a magnetic disk apparatus or a servo of a rotation system, having the above-mentioned feature.

The adders simply add the input signals and generate the output signal. However, the adders of the present invention are not limited to the above adders. For example, the adder may appropriately weight the signal before inputting the signal to the adder. Further, the adder of the present invention is not limited to an adder and, advantageously, an adding circuit or the like is used.

While this invention has thus far been described in conjunction with embodiments thereof, it will now be readily possible for those skilled in the art to put this invention into practice in various other manners. For instance, the present invention is not limited to the number of components, the position and the shape of the component, and the like according to the first to ninth embodiments, and may be modified to have the preferred number of components, the preferred position and shape of the component, and the like. As described above, any modification can be embodied without departing the essentials of the present invention.

What is claimed is:

1. A positioning control apparatus for controlling a moving member to trace the position of a target member, said target member almost-equally repeating position shift at a predetermined period, said positioning control apparatus comprising:
    a position detector which detects a relative position error between said moving member and a target position of said target member;
    a first adding unit which adds a delay signal and a position error signal which is outputted by said position detector, wherein the output of said first adding unit is a first sum;
    a signal delay unit which outputs said delay signal which is obtained by filtering by a first filter and delaying a first sum output of said first adding unit at a period corresponding to the position shift of said target member;
    a second filter having predetermined frequency characteristics, which receives the output of the signal delay unit as an input;
    an additional adding unit which adds said position error signal, said delay signal, and said second filter output;
    a drive unit for driving said moving member by a signal based on an output of said additional adding unit; and
    a delay-amount setting unit for setting the amount of delay of a signal which is delayed by said signal delay unit.

2. A positioning control apparatus according to claim 1, wherein
    said predetermined frequency characteristic of said second filter is approximately equal to an inverse characteristic (1/G) of an open loop transfer function of a positioning control loop (G) at least nearby the frequency where a gain of the open loop transfer function of the positioning control loop is substantially equal to 1, wherein said positioning control loop includes said moving member, said position detector, and said drive unit.

3. A positioning control apparatus according to claim 1, wherein said delay-amount setting unit sets the amount of signal delay of said signal delay unit based on a signal indicating a movement period of said target member, which is obtained by said target member.

4. A positioning control apparatus according to claim 1, wherein when the period of the position shift of said target member is changed, said delay-amount setting unit comprises means for changing the amount of signal delay in said signal delay unit in accordance with the change in period of the position shift of said target member.

5. A positioning control apparatus according to claim 1, wherein said delay-amount setting unit sets the amount of signal delay of said signal delay unit based on a reference signal of a movement period of said target member.

6. A positioning control apparatus for controlling a moving member to trace the position of a target member, said target member almost-equally repeating position shift at a predetermined period, said positioning control apparatus comprising:
    a position detector for detecting a relative position error between said moving member and a target position of said target member;
    a first adder for adding a delay signal and a position error signal which is outputted by said position detector;
    a signal delay unit for outputting said delay signal which is obtained by delaying an output of said first adder at a period corresponding to the position shift of said target member;
    a second adder for adding said position error signal and said delay signal;
    a compensating unit for performing at least one of the compensation for offset and the compensation for stabilization of said positioning control apparatus by using a signal based on an output of said second adder;
    a filter having characteristics, by which the amount of movement of said moving member matches the amount of position shift indicated by said delay signal, within a specified frequency range;
    a third adder for adding an output of said compensating unit and an output of said filter;
    a drive unit for driving said moving member by a signal based on an output of said third adder; and
    a delay-amount setting unit for setting the amount of delay of a signal which is delayed by said signal delay unit.

7. A positioning control method for controlling a moving member to trace the position of a target member, said target member almost-equally repeating position shift at a predetermined period, said positioning control method including:
    a position detecting step of detecting a relative position error between said moving member and a target position of said target member;
    a first adding step of adding a delay signal and a position error signal which is outputted by said position detecting step;
    a signal delay step of outputting said delay signal which is obtained by first filtering and delaying an output of said first adding step at a period corresponding to the position shift of said target member;
    a filtering step of a second filter having predetermined frequency characteristics, which receives the output of the signal delay unit as an input;
    an additional adding step of adding said position error signal, said delay signal, and the delay signal filtered in said filtering step via the second filter;
    a drive step of driving said moving member by a signal based on an output of said additional adding step; and
    a delay-amount setting step of setting the amount of delay of a signal which is delayed in said signal delay step.

8. A positioning control method according to claim 7, wherein
    said predetermined frequency characteristic of said second filter is approximately equal to an inverse characteristic (1/G) of an open loop transfer function of a positioning control loop (G) at least nearby the frequency where a gain of the open loop transfer function of the positioning control loop is substantially equal to 1, wherein said positioning control loop includes said moving member, said position detecting step, and said drive step.

9. A positioning control method according to claim 7, wherein in said delay-amount setting step, the amount of signal delay of said signal delay step is set based on a signal indicating a movement period of said target member, which is obtained by said target member.

10. A positioning control method according to claim 7, wherein when the period of the position shift of said target member is changed, said delay-amount setting step comprises a step of changing the amount of signal delay in said signal delay step in accordance with the change in period of the position shift of said target member.

11. A positioning control method according to claim 7, wherein, in said delay-amount setting step, the amount of signal delay of said signal delay step is set based on a reference signal of a movement period of said target member.

12. A positioning control method for controlling a moving member to trace the position of a target member, said target member almost-equally repeating position shift at a predetermined period, said positioning control method comprising:
- a position detecting step of detecting a relative position error between said moving member and a target position of said target member;
- a first adding step of adding a delay signal and a position error signal which is outputted in said position detecting step;
- a signal delay step of outputting said delay signal which is obtained by delaying an output of said first adding step at a period corresponding to the position shift of said target member;
- a second adding step of adding said position error signal and said delay signal;
- a compensating step of performing at least one of the compensation for offset and the compensation for stabilization of said positioning control method by using a signal based on an output of said second adding step;
- a filtering step of a filter having characteristics, by which the amount of movement of said moving member matches the amount of position shift indicated by said delay signal, within a specified frequency range;
- a third adding step of adding an output of said compensating step and an output of said filter;
- a drive step of driving said moving member by a signal based on an output of said third adding step; and
- a delay-amount setting step of setting the amount of delay of a signal which is delayed in said signal delay step.

13. A positioning control apparatus for controlling a moving member to trace the position of a target member, said target member almost-equally repeating position shift at a predetermined period, said positioning control apparatus comprising:
- a position detector for detecting a relative position error between said moving member and said target member;
- a first adding unit for adding and outputting a delay signal and a position error signal which is outputted by said position detector;
- a signal delay unit for outputting said delay signal which is obtained by delaying an output of said first adding unit at a period corresponding to the position shift of said target member;
- a filter for subjecting said delay signal to filtering step with predetermined frequency characteristics;
- an additional adding unit for adding and outputting said position error signal, said delay signal, and the delay signal processed by said filter;
- a drive unit for driving said moving member based on a signal based on an output signal of said additional adding unit; and
- a mode switching unit for switching a control mode.

14. A positioning control apparatus according to claim 13, wherein said filter includes, as said predetermined frequency characteristics, a frequency where a gain of an open loop transfer function of a positioning control loop including said moving member, said position detector, and said drive unit becomes equal to 1 in approximation.

15. A positioning control apparatus according to claim 13, wherein said predetermined frequency characteristics are approximately equal to inverse characteristics (1/G) of an open loop transfer function of a position control loop (G) including said moving member, said position detector, and said drive unit.

16. A positioning control apparatus according to claim 13, wherein said mode switching unit comprises means for changing the frequency characteristics of said signal delay unit.

17. A positioning control apparatus according to claim 13, wherein said mode switching unit comprises means for on/off operation of inputting an output from said filter to said additional adding unit.

18. A positioning control apparatus according to claim 13, wherein said mode switching unit comprises at least one of means for on/off operation of inputting said delay signal to said first adding unit and means for on/off operation of inputting said delay signal to said additional adding unit.

19. A positioning control apparatus according to claim 13, wherein said mode switching unit comprises state holding means for holding an inner state of said signal delay unit.

20. A positioning control apparatus according to claim 13, wherein said mode switching unit comprises means for on/off operation of inputting said position error signal to said first adding unit.

21. A positioning control apparatus according to claim 13, wherein said mode switching unit comprises at least one of means for changing the frequency characteristics of said signal delay unit, means for on/off operation of inputting an output from said filter to said additional adding unit, on/off operation of inputting said delay signal to said first adding unit, means for on/off operation of inputting said delay signal to said additional adding unit, state holding means for holding an inner state of said signal delay unit, means for on/off operation of inputting said position error signal to said first adding unit.

22. A positioning control apparatus for controlling a moving member to trace the position of a target member, said target member almost-equally repeating position shift at a predetermined period, said positioning control apparatus comprising:
- a position detector for detecting a relative position error between said moving member and said target member;
- a first adder for adding and outputting a delay signal and a position error signal which is outputted by said position detector;
- a signal delay unit for outputting said delay signal which is obtained by delaying an out-put of said first adder at a period corresponding to the position shift of said target member;
- a second adder for adding and outputting said position error signal and said delay signal;
- a compensating unit for performing at least one of the compensation for offset and the compensation for stabilization of said positioning control apparatus by using an output of said second adder as an input to said compensating unit;
- a filter for subjecting said delay signal to filtering processing with characteristics by which the amount of movement of said moving member matches the amount of position shift indicated by said delay signal within a specified frequency range;

a third adder for adding and outputting an output of said compensating unit and an output of said filter;

a drive unit for driving said moving member based on an output signal of said third adder; and a mode switching unit for switching a control mode.

23. A positioning control method for controlling a moving member to trace the position of a target member, said target member almost-equally repeating position shift at a predetermined period, said positioning control method including:

a position detecting step of detecting a relative position error between said moving member and said target member;

a first adding step of adding and outputting a delay signal and a position error signal which is outputted in said position detecting step;

a signal delay step of outputting said delay signal which is obtained by delaying an output of said first adding step at a period corresponding to the position shift of said target member;

a filtering step of subjecting said delay signal to filtering step with predetermined frequency characteristics;

an additional adding step of adding and outputting said position error signal, said delay signal, and the delay signal processed by said filtering step;

a drive step of driving said moving member based on an output signal of said additional adding step; and a mode switching step of switching a control mode.

24. A positioning control method according to claim 23, wherein said filtering step uses, as said predetermined frequency characteristics, a frequency where a gain of an open loop transfer function of a positioning control loop including said moving member, said position detecting step, and said drive step becomes equal to 1 in approximation.

25. A positioning control method according to claim 23, wherein said predetermined frequency characteristics are approximately equal to inverse characteristics (1/G) of an open loop transfer function of a position control loop (G) transfer characteristics including said moving member, said position detecting step, and said drive step.

26. A positioning control method according to claim 23, wherein said mode switching step comprises a step of changing the frequency characteristics of said signal delay step.

27. A positioning control method according to claim 23, wherein said mode switching step comprises a step of on/off operation of inputting said filtering-processed delay signal to said additional adding step.

28. A positioning control method according to claim 23, wherein said mode switching step comprises at least one of a step of on/off operation of inputting said delay signal to said first adding step and a step of on/off operation of inputting said delay signal to said additional adding step.

29. A positioning control method according to claim 23, wherein said mode switching step comprises a state holding step of holding an inner state of said signal delay step.

30. A positioning control method according to claim 23, wherein said mode switching step comprises a step of on/off operation of inputting said position error signal to said first adding step.

31. A positioning control method according to claim 23, wherein said mode switching step comprises at least one of a step of changing the frequency characteristics of said signal delay step, a step of on/off operation of inputting said filtering-processing delay signal to said additional adding step, a step of on/off operation of inputting said delay signal to said first adding step, a step of on/off operation of inputting said delay signal to said additional adding step, a state holding step of holding an inner state of said signal delay step, a step of on/off operation of inputting said position error signal to said first adding step.

32. A positioning control method for controlling a moving member to trace the position of a target member, said target member almost-equally repeating position shift at a predetermined period, said positioning control method comprising:

a position detecting step of detecting a relative position error between said moving member and said target member;

a first adding step of adding and outputting a delay signal and a position error signal which is outputted by said position detecting step;

a signal delay step of outputting said delay signal which is obtained by delaying an output of said first adding step at a period corresponding to the position shift of said target member;

a second adding step of adding and outputting said position error signal and said delay signal;

a compensating step of performing at least one of the compensation for offset and the compensation for stabilization of said positioning control method by using an output of said second adding step as an input to said compensating step;

a filtering step of subjecting said delay signal to filtering processing with characteristics by which the amount of movement of said moving member matches the amount of position shift indicated by said delay signal within a specified frequency range;

a third adding step of adding and outputting an output of said compensating step and said filtering-processed delay signal;

a drive step of driving said moving member by a signal based on an output signal of said third adding step; and a mode switching step for switching a control mode.

33. A positioning control apparatus for controlling a moving member to trace the position of a target member, said target member repeating position shift with an almost equal period, said positioning control apparatus comprising:

a position detecting unit for detecting a relative position error between said moving member and a target position of said target member and outputting a position error signal;

a first adding unit for generating an output signal based on said position error signal and a delay signal;

a pass-band setting unit for passing only a predetermined frequency band from the output signal of said first adding unit;

a signal delay unit for outputting said delay signal which is obtained by delaying an output signal of said pass-band setting unit by a period corresponding to the position shift;

a filtering unit having predetermined frequency characteristics;

an additional adding unit for generating an output signal based on said position error signal, said delay signal, and the delay signal processed by said filtering unit; and a drive unit for driving said moving member based on an output signal of said additional adding unit.

34. A positioning control apparatus according to claim 33, wherein said signal delay unit comprises band limiting means for passing only a predetermined frequency band from a signal inputted from said pass-band setting unit.

35. A positioning control apparatus according to claim 34, wherein the frequency band which is passed by said pass-band setting unit is included in a frequency band which is passed by said band limiting means.

36. A positioning control apparatus according to claim 33, wherein said filter includes, as said predetermined frequency characteristics, a frequency where a gain of an open loop transfer function of a positioning control loop including said moving member, said position detecting unit, and said drive unit becomes equal to 1 in approximation.

37. A positioning control apparatus according to claim 33, wherein said predetermined frequency characteristics are approximately equal to inverse characteristics (1/G) of an open loop transfer function of a position control loop (G) including said moving member, said position detecting unit, and said drive unit.

38. A positioning control apparatus according to claim 33, wherein said pass-band setting unit has characteristics for passing a frequency component of frequency from which a gain of an open loop transfer function of a positioning control loop including said moving member, said position detecting unit, and said drive unit is equal to 1 in approximation, and/or a predetermined frequency component of frequency lower than the frequency from which a gain of said open loop transfer function of the positioning control loop is equal to 1 in approximation.

39. A positioning control apparatus for controlling a moving member to trace the position of a target member, said target member repeating position shift with an almost-equal period, said positioning control apparatus comprising:
 a position detecting unit for detecting a relative position error between said moving member and a target position of said target member and outputting a position error signal;
 a first adding unit for generating an output signal based on a delay signal and said position error signal;
 a pass-band setting unit for passing only a predetermined frequency band from the output signal of said first adding unit;
 a signal delay unit for outputting said delay signal which is obtained by delaying an output signal of said pass-band setting unit by a period corresponding to the position shift;
 a second adder for generating an output signal based on said position error signal and said delay signal;
 a compensating unit for performing compensation for stabilization of said positioning control apparatus and/or compensation for offset based on the output of said second adder;
 a filtering unit having characteristics by which the amount of said moving member matches the amount of position shift indicated by said delay signal within a predetermined frequency range;
 a third adding unit for generating an output signal based on said an output signal of said compensating unit and an output signal of said filtering unit; and
 a drive unit for driving said moving member based on the output signal of said third adding unit.

40. A positioning control apparatus according to claim 39, wherein said predetermined frequency range includes a frequency where a gain of an open loop transfer function of a positioning control loop including said moving member, said position detector, said compensating unit, and said drive unit becomes equal to 1 in approximation.

41. A positioning control apparatus according to claim 39, wherein said first, said second, and said third adding units add input signals, respectively, thereby generating an output signal.

42. A positioning control method for controlling a moving member to trace the position of a target member, said target member repeating position shift with an almost equal period, said positioning control method comprising:
 a position detecting step of detecting a relative position error between said moving member and a target position of said target member and outputting a position error signal;
 a first adding step of generating an output signal based on a delay signal and said position error signal;
 a pass-band setting step of passing only a predetermined frequency band from the output signal of said first adding step;
 a signal delay step of outputting said delay signal which is obtained by delaying an output signal of said pass-band setting step by a period corresponding to the position shift;
 a filtering step having predetermined frequency characteristics;
 an additional adding step of generating an output signal based on said position error signal, said delay signal, and the delay signal processed by said filtering step; and
 a drive step of driving said moving member based on an output signal of said additional adding step.

43. A positioning control method according to claim 42, wherein said signal delay step comprises band limiting processing for passing only a predetermined frequency band from a signal inputted from said pass-band setting step.

44. A positioning control method according to claim 43, wherein the frequency band which is passed by said pass-band setting step is included in a frequency band which is passed by said band limiting processing.

45. A positioning control method according to claim 42, wherein said filtering step uses, as said predetermined frequency characteristics, a frequency where a gain of an open loop transfer function of a positioning control loop including said moving member, a position detecting unit of performing said position detecting step, and a drive unit for performing said drive step becomes equal to 1 in approximation.

46. A positioning control method according to claim 42, wherein said predetermined frequency characteristics are approximately equal to inverse characteristics (1/G) of an open loop transfer function of a position control loop (G) including said moving member, said position detecting step, said compensating step, and said drive step.

47. A positioning control method according to claim 42, wherein said pass-band setting step has characteristics for passing a frequency component of frequency from which a gain of an open loop transfer function of a positioning control loop including said moving member, said position detecting step, said compensating step, and said drive step is equal to 1 in approximation, and/or a predetermined frequency component of frequency lower than the frequency from which a gain of said open loop transfer function of the positioning control loop is equal to 1 in approximation.

48. A positioning control method for controlling a moving member to trace the position of a target member, said target member repeating position shift with an almost equal period, said positioning control method comprising:
- a position detecting step of detecting a relative position error between said moving member and a target position of said target member and outputting a position error signal;
- a first adding step of generating an output signal based on a delay signal and a position error signal;
- a pass-band setting step of passing only a predetermined frequency band from the output signal of said first adding step;
- a signal delay step of outputting said delay signal which is obtained by delaying an output signal of said pass-band setting step by a period corresponding to the position shift;
- a second adding step of generating an output signal based on said position error signal and said delay signal;
- a compensating step of performing compensation for stabilization of said positioning control apparatus and/or compensation for offset based on the output of said second adding step;
- a filtering step having characteristics by which the amount of said moving member matches the amount of position shift indicated by said delay signal within a predetermined frequency range;
- a third adding step of generating an output signal based on said an output signal of said compensating step and an output signal of said filtering step; and
- a drive step of driving said moving member based on the output signal of said third adding step.

49. A positioning control method according to claim 48, wherein said predetermined frequency range includes a frequency where a gain of an open loop transfer function transfer characteristics of a positioning control loop including said moving member, said position detecting step, said compensating step, and said drive step becomes equal to 1 in approximation.

50. A positioning control method according to claim 48, wherein said first, said second, and said third adding steps add input signals, respectively, thereby generating an output signal.

51. A positioning control apparatus according to claim 1, wherein a transfer characteristic F(s) of said second filter having predetermined frequency characteristic satisfies the relationship of $|1-G(s)F(s)|<|1+G(s)|$ when G(s) represents an open loop transfer characteristic of a positioning control loop including said moving member, said position detector, and said drive unit and |X| represents a gain of X.

52. A positioning control apparatus according to claim 1, further comprising a compensating unit for carrying out at least one of a stabilizing compensation or a deviating compensation.

53. A positioning control apparatus according to claim 52, wherein a transfer characteristic F(s) of said second, filter having predetermined frequency characteristic satisfies the relationship of $|1 G(s)F(s)t<(1+G(s)|$ when G(s) represents an open loop transfer characteristic of a positioning control loop including said moving member, said position detector, said compensating unit, and said drive unit and $?X|$ represents a gain of X.

54. A positioning control apparatus according to claim 52, wherein
said predetermined frequency characteristic of said second filter is approximately equal to an inverse characteristic (1/G) of an open loop transfer function of a positioning control loop (G) at least nearby the frequency, where a gain of the open loop transfer function of the positioning control loop is substantially equal to 1, wherein said positioning control loop includes said moving member, said position detector, said compensating unit, and said drive unit.

55. A positioning control method according to claim 7, wherein a transfer characteristic F(s) of the second filter having predetermined frequency characteristics satisfies the relationship of $|1 G(s)F(s)j<|1+G(s)|$ when G(s) represents an open loop transfer characteristic of a positioning control loop including said moving member, said position detecting step, and said drive step and $|X|$ represents a gain of X.

56. A positioning control method according to claim 7, further comprising a compensating step for carrying out at least one of a stabilizing compensation or a deviating compensation.

57. A positioning control method according to claim 56, wherein a transfer characteristic F(s) of the second filter having predetermined frequency characteristics satisfies the relationship of $|1-G(s)F(s)|<|1-G(s)|$ when G(s) represents a open loop transfer characteristic of a positioning control loop including said moving member, said position detecting step, said compensating step, and said drive step and $|X|$ represents a gain of X.

58. A positioning control method according to claim 56, wherein
said predetermined frequency characteristic of said second filter is approximately equal to an inverse characteristic (1/G) of an open loop transfer function of a positioning control loop (G) at least nearby the frequency where a gain of the open loop transfer function of the positioning control loop is substantially equal to 1, wherein said positioning control loop includes said moving member, said position detecting step, said compensating step, and said drive step.

59. A positioning control apparatus according to claim 13, wherein said filter for performing the filtering step with the predetermined frequency characteristic satisfies the relationship of $|1-G(s)F(s)|<|1+G(s)|$ when F(s) represents a transfer characteristic of the filter, G(s) represents a loop transfer characteristic of a positioning control loop including said moving member, said position detector, and said drive unit and |X| represents a gain of X.

60. A positioning control apparatus according to claim 13, further comprising a compensating unit for carrying out at least one of a stabilizing compensation or a deviating compensation.

61. A positioning control apparatus according to claim 60, wherein said filter for performing the filtering step with the predetermined frequency characteristic satisfies the relationship of $|1-G(s)F(s)|<|1+G(s)|$ when F(s) represents a transfer characteristic of the filter, G(s) represents a loop transfer characteristic of a positioning control loop including said moving member, said position detector, said compensating unit, and said drive unit and |X| represents a gain of X.

62. A positioning control apparatus according to claim 60, wherein a loop transfer characteristic of the positioning control loop including said moving member, said position detector, said compensating unit, and said drive unit further comprises a frequency which realizes a gain of approximately equal to 1.

63. A positioning control apparatus according to claim 60, wherein said predetermined frequency characteristic is approximately equal to the inverse characteristic of a loop transfer characteristic of a positioning control loop including said moving member, said position detector, said compensating unit, and said drive unit.

64. A positioning control method according to claim 23, wherein said filter for performing the filtering step with the predetermined frequency characteristic satisfies the relationship of $|1-G(s)F(s)|<|1+G(s)|$ where $F(s)$ represents a transfer characteristic of the filter, $G(s)$ represents a loop transfer characteristic of a positioning control loop including said moving member, said position detecting step, and said drive step and $|X|$ represents a gain of X.

65. A positioning control method according to claim 23, further comprising a compensating step for carrying out at least one of a stabilizing compensation or a deviating compensation.

66. A positioning control method according to claim 65, wherein said filtering step performed with the predetermined frequency characteristic satisfies the relationship of $|1-G(s)F(s)|<|1+G(s)|$ when $F(s)$ represents a transfer characteristic of the filter, $G(s)$ represents a loop transfer characteristic of a positioning control loop including said moving member, said position detecting step, said compensating step, and said drive step and $|X|$ represents a gain of X.

67. A positioning control method according to claim 65, wherein a predetermined frequency characteristic comprises a frequency which realizes a gain of approximately equal to 1 for a loop transfer characteristic of a positioning control loop including said moving member, said position detecting step, said compensating step, and said drive step.

68. A positioning control method according to claim 65, wherein said predetermined frequency characteristic is approximately equal to the inverse characteristic of a loop transfer characteristic of a positioning control loop including said moving member, said position detecting step, said compensating step, and said drive step.

69. A positioning control apparatus according to claim 33, wherein each of the adding units adds the supplied signals for generating the output signals.

70. A positioning control apparatus according to claim 33, wherein a transfer characteristic $F(s)$ of said filter having predetermined frequency characteristics and a transfer characteristic $Fb(s)$ of pass-band setting means satisfy the relationship of $|1-G(s)F(s)||Fb(s)|<|1+G(s)|$ when $G(s)$ represents a loop transfer characteristic of a positioning control loop including said moving member, said position detecting unit, and said drive unit and $|x|$ represents a gain of X.

71. A positioning control apparatus according to claim 33, further comprising a compensating unit for carrying out a stabilizing compensation and/or a deviation compensation.

72. A positioning control apparatus according to claim 71, wherein a transfer characteristic $F(s)$ of said filter having predetermined frequency characteristics and a transfer characteristic $Fb(s)$ of pass-band setting means satisfy the relationship of $|1-G(s)F(s)||Fb(s)|<|1+G(s)|$ when $G(s)$ represents a loop transfer characteristic of a positioning control loop including said moving member, said position detecting means, and said compensating unit, and said drive unit and $|X|$ represents a gain of X.

73. A positioning control apparatus according to claim 71, wherein the predetermined frequency characteristic comprises a frequency which realizes a gain of approximately equal to 1 for a loop transfer characteristic of the positioning control loop including said moving member, said position detecting means, said compensating unit, and said drive unit.

74. A positioning control apparatus according to claim 71, wherein said predetermined frequency characteristic is approximately equal to the inverse characteristic (1/G) of a loop transfer characteristic (G) of a positioning control loop including said moving member, said position detector, said compensating unit, and said drive unit.

75. A positioning control apparatus according to claim 71, wherein said pass-band setting means has a characteristic which renders a frequency component of frequency which realizes a gain of approximately 1 for the loop transfer characteristic of the positioning control loop including the moving member, the position detection means, said compensating unit, and said drive unit, and/or a predetermined frequency component which is lower than a frequency that realizes a gain of approximately 1 for said loop transfer characteristic to be passed.

76. A positioning control method according to claim 42, wherein each of the adding units adds the supplied signals for generating the output signals.

77. A positioning control method according to claim 42, wherein a transfer characteristic $F(s)$ of said filter having predetermined frequency characteristics and a transfer characteristic $Fb(s)$ of pass-band setting means satisfy the relationship of $|1-G(s)F(s)||Fb(s)|<|1+G(s)|$ when $G(s)$ represents a loop transfer characteristic of a positioning control loop including said moving member, said position detecting step, and said drive step and $|X|$ represents a gain of X.

78. A positioning control method according to claim 42, wherein said predetermined frequency characteristic is approximately equal to the inverse characteristics (1/G) of a loop transfer characteristic (G) of a positioning control loop including said moving member, said position detecting step, and said drive step.

79. A positioning control method according to claim 42, wherein said pass-band setting means has a characteristic which renders a frequency component of frequency which realizes a gain of approximately 1 for the loop transfer characteristic of the positioning control loop including the moving member, the position detection step, and said drive unit, and/or a predetermined frequency component which is lower than a frequency that realizes a gain of approximately 1 for said loop transfer characteristic to be passed.

80. A positioning control method according to claim 42, further comprising a compensating step for carrying out a stabilizing compensation and/or a deviation compensation.

81. A positioning control method according to claim 80, wherein a transfer characteristic $F(s)$ of said filtering step having predetermined frequency characteristics and a transfer characteristic $Fb(s)$ of pass-band setting step satisfy the relationship of $|1-G(s)F(s)||Fb(s)|<|1+G(s)|$ when $G(s)$ represents a loop transfer characteristic of a positioning control loop including said moving member, said position detecting step, said compensating step, and said drive step and $|X|$ represents a gain of X.

82. A positioning control method according to claim 80, wherein the predetermined frequency characteristic comprises a frequency which realizes a gain of approximately equal to 1 for a loop transfer characteristic of the positioning control loop including said moving member, said position detecting step, said compensation step, and said drive step.

83. A positioning control apparatus according to claim 1, wherein said first filter has a low-pass filter characteristic.

84. A positioning control apparatus according to claim 52, wherein said first filter has a low-pass filter characteristic.

85. A positioning control method according to claim 7, wherein the first filtering operates as a low-pass filtering.

86. A positioning control method according to claim 56, wherein the first filtering operates as a low-pass filtering.

* * * * *

UNITED STATES PATENT AND TRADEMARK OFFICE
CERTIFICATE OF CORRECTION

PATENT NO. : 7,136,339 B2
APPLICATION NO. : 10/156132
DATED : November 14, 2006
INVENTOR(S) : Masashi Kubota, Shigeru Shimonou and Naotoshi Iwazawa It is certified that error appears in the above-identified patent and that said Letters Patent is hereby corrected as shown below:

Column 11, line 37, delete "$F(s)=G(s)^{31\ 1}x\{3.14x10^5/(s+3.14x10^5)\}^2$" and insert --$F(s)=G(s)^{-1\ 1}x\{3.14x10^5/(s+3.14x10^5)\}^2$--

Column 19, line 56, delete "Is" and insert --is--.

Signed and Sealed this

Thirteenth Day of February, 2007

JON W. DUDAS
*Director of the United States Patent and Trademark Office*